United States Patent
Hsieh

(10) Patent No.: US 11,477,712 B2
(45) Date of Patent: Oct. 18, 2022

(54) MAINTAINING COMMUNICATION AND SIGNALING INTERFACES THROUGH A NETWORK ROLE TRANSITION

(71) Applicant: Google LLC, Mountain View, CA (US)

(72) Inventor: Ching-Jung Hsieh, Taipei (TW)

(73) Assignee: Google LLC, Mountain View, CA (US)

(*) Notice: Subject to any disclaimer, the term of this patent is extended or adjusted under 35 U.S.C. 154(b) by 35 days.

(21) Appl. No.: 17/054,921

(22) PCT Filed: Jun. 20, 2019

(86) PCT No.: PCT/US2019/038319
§ 371 (c)(1),
(2) Date: Nov. 12, 2020

(87) PCT Pub. No.: WO2019/246446
PCT Pub. Date: Dec. 26, 2019

(65) Prior Publication Data
US 2021/0227435 A1    Jul. 22, 2021

Related U.S. Application Data

(60) Provisional application No. 62/687,956, filed on Jun. 21, 2018.

(51) Int. Cl.
*H04W 36/08*    (2009.01)
*H04W 36/00*    (2009.01)
*H04W 88/08*    (2009.01)

(52) U.S. Cl.
CPC ....... *H04W 36/08* (2013.01); *H04W 36/0055* (2013.01); *H04W 88/085* (2013.01)

(58) Field of Classification Search
CPC ............. H04W 36/08; H04W 36/0055; H04W 88/085; H04W 84/005; H04W 84/047
See application file for complete search history.

(56) References Cited

U.S. PATENT DOCUMENTS 8,706,119 B2   4/2014   Jeon et al.
9,426,700 B2   8/2016   Hahn et al.
(Continued)

FOREIGN PATENT DOCUMENTS

EP    2925052       9/2015
WO    2012134116    10/2012
(Continued)

OTHER PUBLICATIONS

"3GPP TS 38.473 V15.2.0 (Jun. 2018)", 3rd Generation Partnership Project; Technical Specification Group Radio Access Network; NG-RAN; F1 application protocol (F1AP) (Release 15), Jun. 2018, 161 pages.
(Continued)

*Primary Examiner* — Margaret G Mastrodonato
(74) *Attorney, Agent, or Firm* — Colby Nipper PLLC

(57) ABSTRACT

This document describes methods, devices, systems, procedures, and means of maintaining communication and signaling interfaces during network role transitions, such as a secondary node change or a handover. A source secondary base station holds a source donor Central Unit (Source CU) for its own Distributed Unit (source DU) and for the Distributed Unit(s) of the node base station(s) (node DU). The source secondary base station connects to the node base station via a first F1 interface. The node DU triggers handover of the node base station and connected User Equipment (UE) from the source secondary base station to a target secondary base station. The node base station creates Transport Network Layer (TNL) connectivity toward a target donor Central Unit (Target CU) and exchanges application layer configuration data with the Target CU via a wireless backhaul link implemented utilizing the TNL connectivity. The node base station then sets up a second F1 interface with the Target CU and handover of the node base station and connected User Equipment (UE) from the source secondary base station to a target secondary base station is performed.

20 Claims, 13 Drawing Sheets

(56) References Cited

U.S. PATENT DOCUMENTS

| | | | |
|---|---|---|---|
| 10,218,422 B2 | 2/2019 | Raghavan et al. | |
| 2010/0260096 A1* | 10/2010 | Ulupinar | H04W 40/36 370/315 |
| 2011/0158117 A1 | 6/2011 | Ho et al. | |
| 2012/0315916 A1* | 12/2012 | Van Phan | H04W 36/08 455/442 |
| 2013/0049734 A1 | 2/2013 | Catchpole et al. | |
| 2013/0163504 A1 | 6/2013 | Jia et al. | |
| 2015/0049734 A1 | 2/2015 | Park et al. | |
| 2015/0195795 A1 | 7/2015 | Loehr et al. | |
| 2016/0105831 A1 | 4/2016 | Masini et al. | |
| 2016/0174095 A1 | 6/2016 | Damnjanovic et al. | |
| 2016/0323832 A1 | 11/2016 | Love et al. | |
| 2018/0176710 A1 | 6/2018 | Jang et al. | |
| 2019/0081657 A1 | 3/2019 | Zeng et al. | |
| 2019/0342800 A1* | 11/2019 | Sirotkin | H04W 80/02 |
| 2019/0394084 A1* | 12/2019 | Tsai | H04L 43/16 |
| 2020/0154442 A1 | 5/2020 | Zhou | |
| 2021/0058985 A1* | 2/2021 | Fujishiro | H04W 76/15 |

FOREIGN PATENT DOCUMENTS

| | | |
|---|---|---|
| WO | 2013066129 | 5/2013 |
| WO | 2013166640 | 11/2013 |
| WO | 2017211166 | 12/2017 |
| WO | 2018130115 | 7/2018 |
| WO | 2019246446 | 12/2019 |

OTHER PUBLICATIONS

"Discussion on IAB Node Access Procedure", 3GPP TSG-RAN WG2 Meeting #102, R2-1807401, Busan, Korea, May 21-25, 2018, May 2018, 5 pages.
"Discussion on IAB Node Discovery and Selection", 3GPP TSG-RAN WG2 Meeting #101 bis; R2-1804785, Apr. 20, 2018, 5 pages.
"Handover Procedures for Mobile RN", 3GPP TSG RAN WG3 Meeting #74, San Francisco, USA, Nov. 14-18, 2011, Nov. 2011, 4 pages.
"International Search Report and Written Opinion", PCT Application No. PCT/US2019/038319, dated Oct. 23, 2019, 29 pages.
"Invitation to Pay Additional Fees", PCT Application No. PCT/US2019/038319, dated Sep. 6, 2019, 17 pages.
"LTE; Evolved Universal Terrestrial Radio Access (E-UTRA); Medium Access Control (MAC) protocol specification (3GPP TS 36.321 version 15.8.0 Release 15)", ETSI TS 136 321 V15.8.0 (Jan. 2020), Jan. 2020, 137 pages.
"Overall View on NR Evolution in Rel-17", 3GPP TSG RAN Meeting #84; RP-191500; Samsung, Jun. 10-14, 2019, 20 pages.
"UE Overheating for EN-DC", 3GPP R2-1802414, UE overheating for EN-DC, in 3GPP TSG-RAN WG2 Meeting #101, Apple Inc., Mar. 2, 2018, 3 pages.
"Views on Release 17", Motorola Mobility, Lenovo; 3GPP TSG RAN Plenary Meeting #84; RP-191458, Jun. 3-6, 2019, 9 pages.
Bertenyi, et al., "NG Radio Access Network (NG-RAN)", May 3, 2018, 18 pages.
Klingenbrunn, et al., "Power Backoff Mechanism for Intermodulation Distortion and Harmonic Distortion", Technical Disclosure Commons; Retrieved from https://www.tdcommons.org/dpubs_series/3424, Jul. 13, 2020, 13 pages.
Wu, "Handling Overheating in a Wireless-Communication Device", Technical Disclosure Commons; Retrieved from https://www.tdcommons.org/dpubs_series/2343, Jul. 12, 2019, 22 pages.
"Foreign Office Action", EP Application No. 19736900.2, dated Jul. 21, 2021, 5 pages.
"International Preliminary Report on Patentability", Application No. PCT/US2019/038319, dated Dec. 22, 2020, 19 pages.
"Extended European Search Report", EP Application No. 21188224.6, dated Dec. 9, 2021, 12 pages.
"Foreign Office Action", IN Application No. 202047045069, dated Dec. 3, 2021, 6 pages.

* cited by examiner

MAINTAINING COMMUNICATION AND SIGNALING INTERFACES THROUGH A NETWORK ROLE TRANSITION

RELATED APPLICATION

This application is a national stage entry of International Application No. PCT/US2019/038319, filed 2019 Jun. 20, which claims the benefit of U.S. Provisional Patent Application 62/687,956, filed on 2018 Jun. 21, the disclosures which are incorporated herein by reference in their entirety.

BACKGROUND

The evolution of wireless communication to fifth generation (5G) standards and technologies provides higher data rates and greater capacity, with improved reliability and lower latency, which enhances mobile broadband services. 5G technologies also provide new classes of services for vehicular networking, fixed wireless broadband, and the Internet of Things (IoT). To support these new classes of services, 5G New Radio can be used for access to 3GPP 5G Next Generation NodeB (gNB) base stations that support 5G New Radio (NR), as well as for wireless backhaul of traffic from and to 3GPP 5G gNB base stations that support 5G NR.

A unified air interface, which utilizes licensed, unlicensed, and shared license radio spectrum in multiple frequency bands is one aspect of enabling the capabilities of 5G systems. The 5G air interface utilizes radio spectrum in bands below 1 GHz (sub-gigahertz), below 6 GHz (sub-6 GHz), and above 6 GHz. Radio spectrum above 6 GHz includes millimeter wave (mmWave) frequency bands that provide wide channel bandwidths to support higher data rates for wireless broadband. Another aspect of enabling the capabilities of 5G systems is the use of Multiple Input Multiple Output (MIMO) antenna systems to beamform signals transmitted between base stations and User Equipment to increase the capacity of 5G radio networks.

To increase data rates, throughput, and reliability for a User Equipment, various forms of wireless connectivity that use integrated access and backhaul between base stations and the User Equipment are supported in 5G systems. Techniques such as dual connectivity or coordinated multipoint communications, often coupled with beamformed signals, can improve data rates, throughput, and reliability, especially as received signal strengths decrease for the User Equipment near the edge of cells. The use of these radio link configurations increases the complexity of mobility management to maintain high data rates and reliability for the User Equipment.

The focus of solutions for the operation of integrated access and backhaul for 5G New Radio has previously been on physically fixed relays. While the previous focus has been on physically fixed relays, a diverse range of deployment scenarios for 5GNew Radio can be envisioned, including support for outdoor small cell deployments, indoor deployments, or even mobile relays (e.g., on buses, on trains). In such mobile deployment scenarios, upon a network role transition, such as the handover of a mobile integrated access and backhaul node base station (IAB-Node base station), connected with multiple User Equipment (UE), between a Source IAB-Donor base station (Source IAB-Donor) and a Target IAB-Donor base station (Target IAB-Donor), there is a need for procedure enhancement for helping maintain communication and signaling interfaces through the handover. For example, when a mobile IAB-Node base station, deployed on a bus or a train, to which User Equipment devices are wirelessly connected, migrates between a Source IAB-Donor base station and a Target IAB-Donor base station, the communication and signaling interfaces need to be maintained through the handover.

SUMMARY

This summary is provided to introduce simplified concepts of maintaining communication and signaling interfaces during network role transitions, such as a secondary node change or handover (e.g., through integrated access and backhaul node (IAB-Node) handover between integrated access and backhaul donors (IAB-Donors)). The simplified concepts are further described below in the Detailed Description. This summary is not intended to identify essential features of the claimed subject matter, nor is it intended for use in determining the scope of the claimed subject matter.

Some aspects describe F1 interface application protocol procedures for the Distributed Unit(s) of an IAB-Node connected to the Central Unit of a Source IAB-Donor to establish an F1 interface with a Target IAB-Donor Central Unit in order to achieve handover of the IAB-Node Distributed Unit(s) between the Source IAB-Donor and the Target IAB-Donor. Other aspects describe similar methods performed by a wireless network.

Still other aspects describe methods for maintaining communication interfaces through handover of a node base station from a source donor base station to a target donor base station. The node base station is engaged with a source donor base station via a first F1 interface. In the method, the node base station sends measurement result information to a Source Central Unit of the source donor base station to trigger the handover of the node base station from the source donor base station to the target donor base station. A Distributed Unit of the node base station receives a first interface message from the Source Central Unit. The first interface message notifies the Distributed Unit of a handover decision based on the measurement result information. The first interface message includes configuration information. The Distributed Unit creates Transport Network Layer connectivity towards a Target Central Unit of the target donor base station based on the received configuration information. The Distributed Unit implements a wireless backhaul link with the Target Central Unit that utilizes the Transport Network Layer connectivity. The Distributed Unit exchanges application layer configuration data with the Target Central Unit via the wireless backhaul link. The Distributed Unit sets up a second F1 interface with the Target Central Unit that utilizes the application layer configuration data. The Distributed Unit releases the first F1 interface with the Source Central Unit.

In other aspects, a base station device includes a Distributed Unit connected to a Source Central Unit of a source base station. The Distributed Unit is engaged with the Source Central Unit via a first F1 interface. The Distributed Unit is configured to send measurement result information to the Source Central Unit, which triggers the handover of the base station device from the source base station to a target base station. The Distributed Unit is configured to receive a first interface message from the Source Central Unit, which notifies the Distributed Unit of a handover decision. The first interface message includes configuration information. The Distributed Unit is also configured to create Transport Network Layer connectivity toward a Target Central Unit of the target base station based on the received configuration information. The Distributed Unit is further configured to implement a wireless backhaul link with the Target Central Unit that utilizes the Transport Network Layer connectivity. The Distributed Unit is also configured to exchange application layer configuration data with the Target Central Unit via the wireless backhaul link, set up a second F1 interface with the Target Central Unit that utilizes the application layer configuration data, and release the first F1 interface with the Source Central Unit.

In other aspects, methods and procedures for radio resource control signaling, between User Equipment, an IAB-Node, and IAB-Donors, for the IAB-Node to handover between IAB-Donors are described.

The details of one or more methods, devices, systems, procedures, and means for maintaining communication and signaling interfaces through handover of a node base station from a source donor base station to a target donor base station are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of maintaining communication and signaling interfaces through a network role transition (e.g., integrated access and backhaul node (IAB-Node) handover between integrated access and backhaul donors (IAB-Donors)) are described with reference to the following drawings. The use of the same reference numbers in different instances in the description and the figures may indicate like elements.

DETAILED DESCRIPTION

Figure 1:
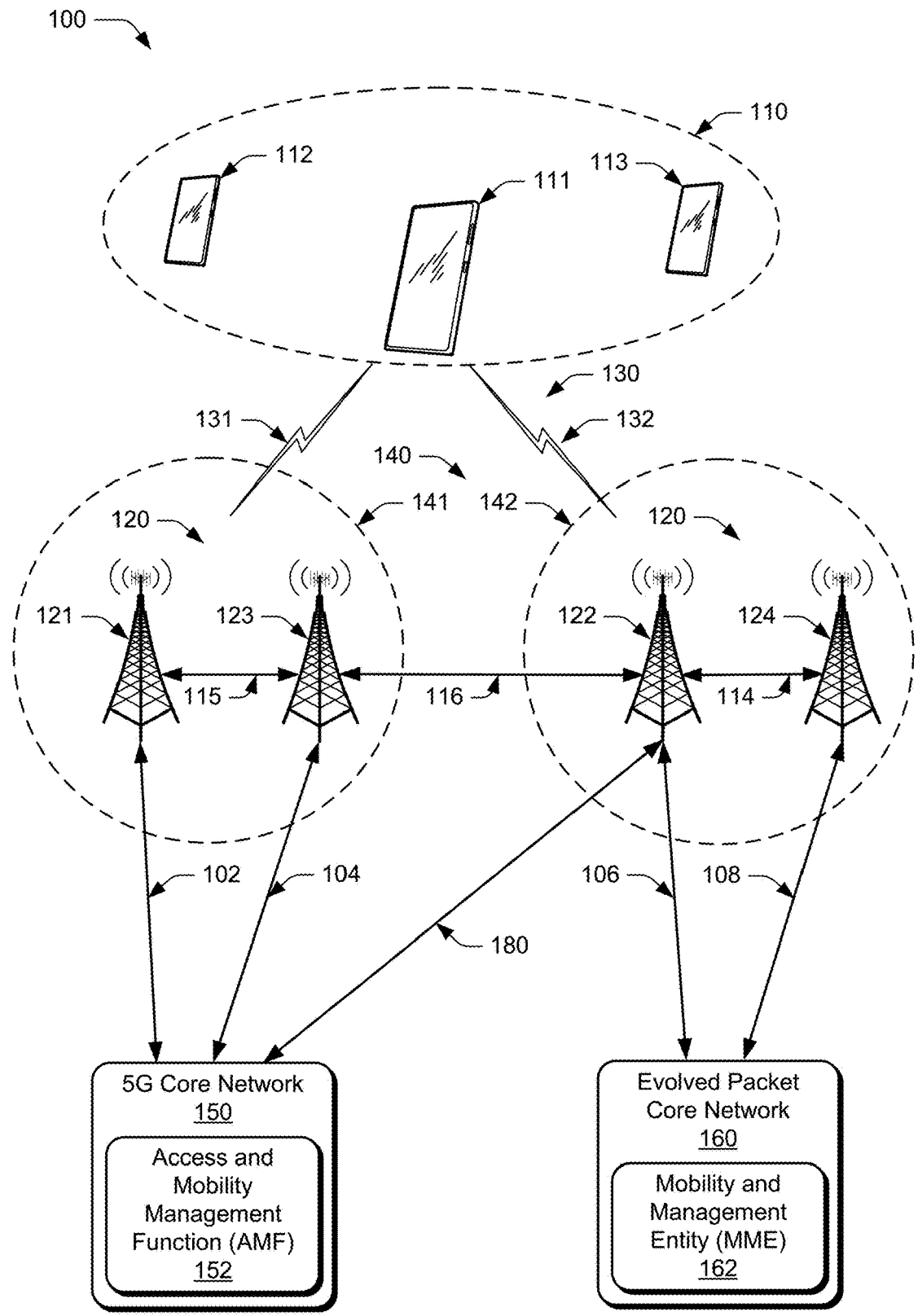
FIG. 1 illustrates an example wireless network system in which various aspects of maintaining communication and signaling interfaces through a network role transition can be implemented.

This document describes methods, devices, systems, procedures, and means for maintaining communication and signaling interfaces through a network role transition (e.g., the handover of a node base station and connected User Equipment (UE) from a source donor base station to a target donor base station). Disclosed herein are also methods, devices, systems, procedures, and means for maintaining communication and signaling interfaces through a network role transition, including determining configurations for the exchange of configuration information during such a network role transition. Disclosed herein are also F1 Application Protocol (F1AP) procedures for maintaining communication interfaces through a network role transition. For example, F1AP procedures for the Distributed Unit (DU) of an IAB-Node held by a Source Target IAB-Donor CU to establish an F1 interface with the Target IAB-Donor CU to achieve handover of the IAB-Node and connected UE in a central unit-distributed unit architecture. Disclosed herein are also radio resource control (RRC) signaling procedures for maintaining signaling interfaces through a network role transition. For example, RRC signaling procedures for an IAB-Node (and connected UE) to handover from a source donor base station to a target donor base station in a central unit-distributed unit architecture.

For a mobile IAB-Node deployed on a vehicle (e.g., bus, train, airplane), since the IAB-Node remains close to the User Equipment (UE) devices on the vehicle when the UE users are staying in the vehicle cabin, it is likely that the UE will perceive strong enough signal to maintain connection with the IAB-Node. Therefore, the typical measurement reporting events defined for handover between a source base station and a target base station (where the entities supporting Layer 2 protocols (e.g., RRC/PDCP/SDAP/RLC/MAC) and Layer 1 protocols (PHY) are co-located) may not be triggered on the UE. Although the Detailed Description references specific standards specifications, future standards using the specified information elements, messages, or technical features are also encompassed.

Application Protocol Identity (AP ID)

An Application Protocol Identity (AP ID) is allocated when a new User Equipment-associated logical connection is created in either an NG-RAN node or an AMF (Core Access and Mobility Management Function). An AP ID uniquely identifies a logical connection associated to a User Equipment (UE) over the Next Generation (NG) interface or the Xn interface within a node (Next Generation Radio Access Network (NG-RAN) node or AMF) or over the F1 interface. Upon receipt of a message that has a new AP ID from the sending node, the receiving node stores the Application Protocol Identity of the sending node for the duration of the logical connection. The receiving node assigns the AP ID to be used to identify the logical connection associated to the User Equipment and includes it, as well as the previously received new AP ID from the sending node, in the first returned message to the sending node. In subsequent messages to and from sending node, both Application Protocol Identities of sending node and receiving node are included.

gNB Central Unit User Equipment F1 Application Protocol Identity

A gNB Central Unit User Equipment F1 Application Protocol Identity (gNB-CU UE F1AP ID) is allocated so as to uniquely identify the User Equipment over the F1 interface within a gNB Central Unit. When a gNB Distributed Unit receives a gNB-CU UE F1AP ID, the gNB Distributed Unit stores the gNB-CU UE F1AP ID for the duration of the User Equipment-associated logical F1-connection for this User Equipment. The gNB-CU UE F1AP ID is unique within the gNB Central Unit logical node.

gNB Distributed Unit User Equipment F1 Application Protocol Identity

A gNB Distributed Unit User Equipment F1 Application Protocol Identity (gNB-DU UE F1AP ID) is allocated so as to uniquely identify the User Equipment over the F1 interface within a gNB Distributed Unit. When a gNB Central Unit receives a gNB-DU UE F1AP ID, gNB Central Unit stores the gNB-DU UE F1AP ID for the duration of the User Equipment-associated logical F1-connection for this User Equipment. The gNB-DU UE F1AP ID is unique within the gNB Distributed Unit logical node.

gNB Distributed Unit Identity

The gNB Distributed Unit Identity (gNB-DU ID) is configured at the gNB Distributed Unit and used to uniquely identify the gNB Distributed Unit at least within a gNB Central Unit. The gNB Distributed Unit provides its gNB-DU ID to the gNB Central Unit during the F1 Setup procedure. The gNB-DU ID is used within F1 interface application protocol procedures.

Integrated Access and Backhaul (IAB) Architectures

The use of "Next Generation NodeB" and "gNB" means a 3GPP 5G Next Generation base station that supports the 5G New Radio, unless the context clearly dictates otherwise. A gNB may have a Central Unit (gNB-CU) and one or more Distributed Units (gNB-DU(s)). A gNB-CU and a gNB-DU are connected via the F1 interface.

The use of "gNB Central Unit" and "gNB-CU" refer to a logical node hosting RRC, SDAP, and PDCP protocols of the gNB or Radio Resource Control (RRC) and Packet Data Convergence Protocol (PDCP) protocols of the en-gNB that controls the operation of one or more gNB-DUs, unless the context clearly dictates otherwise. The gNB-CU terminates the F1 interface connected with the gNB-DU. In a typical implementation, one gNB-DU is connected to only one gNB-CU.

The use of "gNB Distributed Unit" and "gNB-DU" refer to a logical node hosting RLC, MAC and PHY layers of the gNB or en-gNB, and its operation is partly controlled by gNB-CU, unless the context clearly dictates otherwise. One gNB-DU supports one or multiple cells. One cell is supported by only one gNB-DU. The gNB-DU terminates the F1 interface connected with the gNB-CU. In a typical implementation, one gNB-DU is connected to only one gNB-CU. However, for resiliency, a gNB-DU may be connected to multiple gNB-CU by appropriate implementation.

An IAB-Donor base station (e.g., an IAB-Donor gNB) is a Radio Access Network (RAN) node that provides a User Equipment with an interface to the core network and provides wireless backhauling functionality to one or more integrated access and backhaul nodes (IAB-Nodes). An IAB-Donor base station includes a Central Unit (CU) connected to one or more Distributed Units (DU) via an F1 interface (F1). An IAB-Donor base station may hold one or more DU and one or more IAB-Nodes may hold one or more DU. The F1 interface specifications facilitate the interconnection of a gNB-CU and a gNB-DU supplied by different manufacturers. The F1 interface, along with the NG interface and the Xn interface, are logical interfaces described by the technical specifications for New Radio and related specifications.

An IAB-Node base station (e.g., an IAB-Node gNB) is a RAN node that supports wireless access to a User Equipment and wirelessly backhauls the access traffic. An IAB-Node holds a Distributed Unit (DU) (e.g., gNB-DU) and a Mobile-Termination (MT) function. The MT function is a component of mobile equipment that offers a function residing on an IAB-Node that terminates the radio interface layers of the backhaul Uu interface toward the IAB-Donor or other IAB-Nodes.

In communication systems implemented in accordance with a central node-distributed node architecture (e.g., having IAB-Donors, IAB-Nodes, and User Equipment (UE)), the Mobile-Termination (MT) function of an IAB-Node and the connected UE maintain Radio Resource Control (RRC) connections with the IAB-Donor (e.g., the CU-CP of the IAB-Donor). In such communication systems, the Next Generation Radio Access Network (NG-RAN) architecture does not specify the related F1 interface signaling for the IAB-Node to handover between IAB-Donors, nor does the NG-RAN architecture specify the related radio resource control (RRC) signaling for the IAB-Node to handover between IAB-Donors.

As the IAB-Node (node base station) may include a DU and a MT, while the IAB-Donor (the Source IAB-Donor, donor base station) containing a Central Unit (e.g., gNB-CU) is located at a separate place, it may be useful for the mobile IAB-Node to connect to another IAB-Donor (the Target IAB-Donor) for certain situations such as lower communication latency, better backhaul signal, or better load balancing. In such a case, instead of the User Equipment (UE) performing measurement reporting, the IAB-Node can be the agent to handle the reporting of measured parameters related to the IAB-Node. Examples of measured parameters related to the IAB-Node include, but are not limited to, reference signal measurement, geolocation data (e.g., current location), moving speed, and moving direction to the IAB-Donor.

In a batch handover of connected UEs to the same IAB-Node, the IAB-Node may serve as an agent for the handover process. This scenario may be beneficial for the mid-range phones as they may be less powerful or well-designed/equipped and thus usually suffer from low quality of connections during high moving speed. On the contrary, the IAB-Node can be more powerful and have more design spaces for radio frequency (RF), antenna to adjust to high speed moving, and less concern on power saving issues like phone UEs.

In IAB-Node handover, a Source IAB-Donor, which includes a Central Unit connected to a Distributed Unit (DU) of an IAB-Node, performs handover of the DU (and any IAB-Nodes and UE devices connected thereto) to a Central Unit (CU) of a Target IAB-Donor. Upon such a network role transition, there is a need for the Source IAB-Donor base station and the Target IAB-Donor to exchange configurations and/or signaling to assist the Target IAB-Donor in preparing for follow-up configurations. In central unit-distributed unit architectures, no defined process or protocol has been specified for maintaining communication and signaling interfaces through IAB-Node handover between IAB-Donors.

By way of background, Next Generation Radio Access Network (NG-RAN), Xn Application Protocol (XnAP), Radio Resource Control (RRC), and protocol specification are specified in 3rd Generation Partnership Project (3GPP) technical specification (TS) 38.331 v15.0.1, TS 37.340 v15.0.0, and TS 36.423 v15.0.0; an overall description of New Radio (NR) is specified in 3GPP TS 38.300 v15.0.0; integrated access and backhaul (IAB) is specified in 3GPP TS 38.874 v0.2.1; NG-RAN and XnAP are further specified in 3GPP TS 38.423 v1.0.0; and the F1 interface and interaction between Central Units (CU) and Distributed Units (DU) and the content of UE Context Setup/Modification Requests are introduced in 3GPP TS 38.401 v15.0.0 and 38.473 v15.0.0. As described in 3GPP TR 38.874 v0.2.1, integrated access and backhaul (IAB) for New Radio in 3GPP NG-RAN architecture strives to reuse existing functions and interfaces defined for access. In particular, Mobile-Termination (MT), gNB-DU, gNB-CU, user plane function (UPF), core access and mobility management function (AMF), and session management function (SMF), as well as the corresponding interfaces (e.g., NR Uu interface between MT and gNB, F1 interface, NG interface, X2 interface, and N4 interface) are used as baselines for IAB architectures. In this section the background information related to this disclosure is summarized by way of example only.

Example Environment

Figure 2:
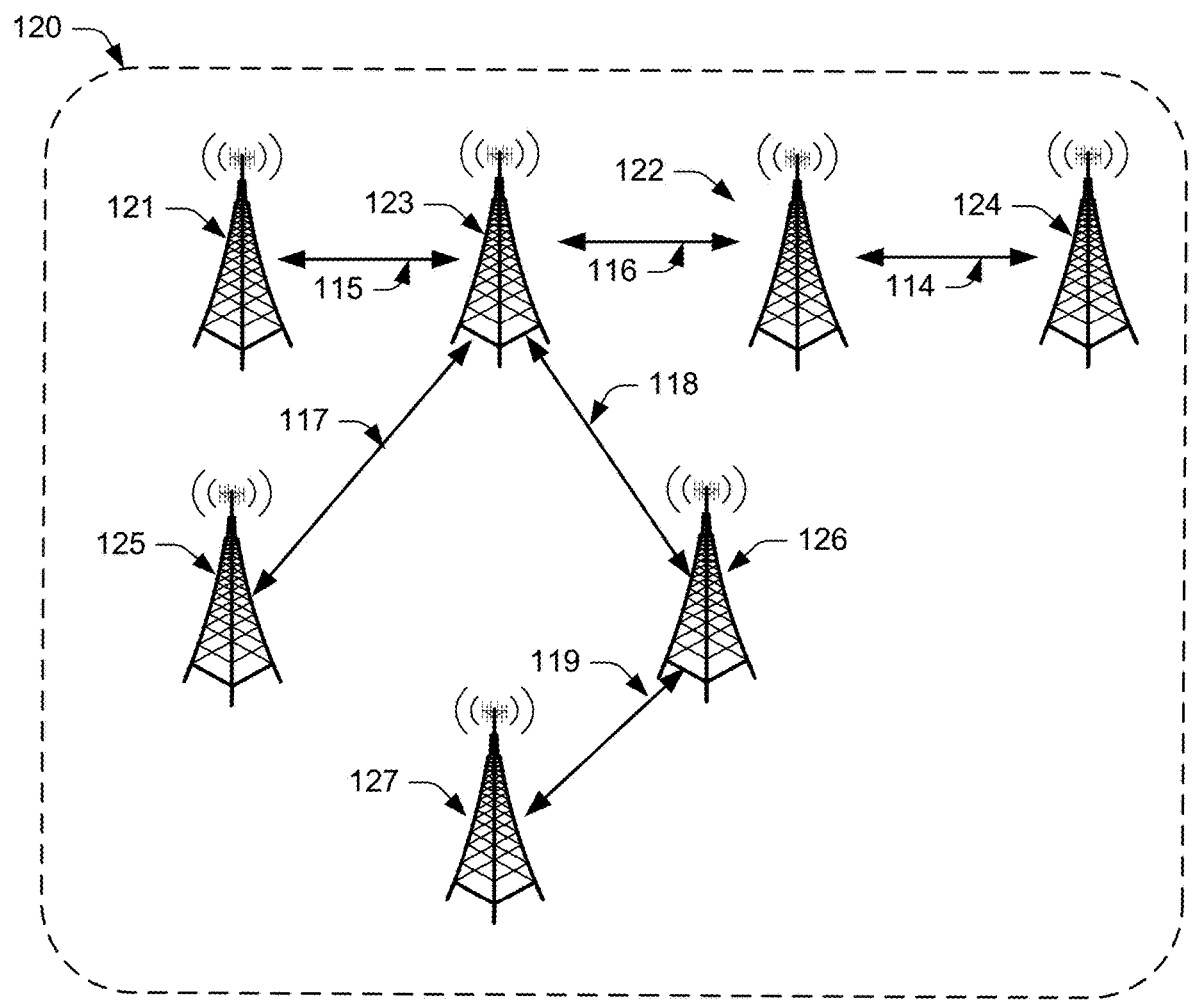
FIG. 2 illustrates a second example wireless network system in which various aspects of maintaining communication and signaling interfaces through a network role transition can be implemented.

FIG. 1 illustrates an example environment 100, which includes multiple User Equipment 110 (UE 110), illustrated as UE 111, UE 112, and UE 113. Each UE 110 can communicate with base stations 120 (illustrated as base stations 121, 122, 123, and 124) through wireless communication links 130 (wireless link 130), illustrated as wireless links 131 and 132. FIG. 2 further illustrates base stations 120 including base stations 121, 122, 123, 124, 125, 126, and 127.

For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device such as a sensor or an actuator. The base stations 120 (e.g., an Evolved Universal Terrestrial Radio Access Network Node B, E-UTRAN Node B, evolved Node B, eNodeB, eNB, Next Generation Node B, gNode B, gNB, or the like) may be implemented in a macrocell, microcell, small cell, picocell, or the like, or any combination thereof.

The base stations 120 communicate with the UE 110 through the wireless links 131 and 132, which may be implemented as any suitable type of wireless link. The wireless links 131 and 132 include control and data communication, such as downlink of data and control information communicated from the base stations 120 to the UE 110, uplink of other data and control information communicated from the UE 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110, as well as dual connectivity, such as single-RAT LTE-LTE or NR-NR dual connectivity or Multi-Radio Access Technology (Multi-RAT) Dual Connectivity (MR-DC). MR-DC includes E-UTRA-NR Dual Connectivity (EN-DC), NG-RAN E-UTRA-NR Dual Connectivity (NGEN-DC), and NR-E-UTRA Dual Connectivity (NE-DC).

The base stations 120 are collectively a Radio Access Network 140 (e.g., RAN, Evolved Universal Terrestrial Radio Access Network, E-UTRAN, 5G NR RAN (NR RAN). The RANs 140 are illustrated as an NR RAN 141 and an E-UTRAN 142. The base stations 121 and 123 in the NR RAN 141 are connected to a Fifth Generation Core 150 (5GC 150) network. The base stations 122 and 124 in the E-UTRAN 142 are connected to an Evolved Packet Core 160 (EPC 160). Optionally or additionally, the base station 122 may connect to both the 5GC 150 and EPC 160 networks.

The base stations 121 and 123 connect, at 102 and 104 respectively, to the 5GC 150 through an NG2 interface for control-plane signaling and using an NG3 interface for user-plane data communications. The base stations 122 and 124 connect, at 106 and 108 respectively, to the EPC 160 using an S1 interface for control-plane signaling and user-plane data communications. Optionally or additionally, if the base station 122 connects to the 5GC 150 and EPC 160 networks, the base station 122 connects to the 5GC 150 using an NG2 interface for control-plane signaling and through an NG3 interface for user-plane data communications, at 180.

In addition to connections to core networks, the base stations 120 may communicate with each other. For example, the base stations 121 and 123 communicate through an Xn interface at 115, the base stations 122 and 123 communicate through an Xn interface at 116, and the base stations 122 and 124 communicate through an X2 interface at 114.

The 5GC 150 includes an Access and Mobility Management Function 152 (AMF 152), which provides control-plane functions, such as registration and authentication of multiple UE 110, authorization, and mobility management in the 5G NR network. The EPC 160 includes a Mobility Management Entity 162 (MME 162), which provides control-plane functions, such as registration and authentication of multiple UE 110, authorization, or mobility management in the E-UTRA network. The AMF 152 and the MME 162 communicate with the base stations 120 in the RAN 140 and also communicate with multiple UE 110, using the base stations 120.

FIG. 2 further illustrates the base stations 120 of FIG. 1, illustrated as base stations 121, 122, 123, 124, 125, 126, and 127. As described with reference to FIG. 1, in addition to connections to core networks, the base stations 120 may communicate with each other. For example, the base stations 121 and 123 communicate through an Xn interface at 115, the base stations 122 and 124 communicate through an X2 interface at 114, the base stations 122 and 123 communicate through an Xn interface at 116, the base stations 123 and 125 communicate through an Xn interface at 117, the base stations 123 and 126 communicate through an F1 interface at 118, and the base stations 126 and 127 communicate through an F1 interface at 119. F1 interfaces 118 and 119 may be F1*, a modified form of F1.

In FIG. 2, base station 123 is a first IAB-Donor base station, base station 122 is a second IAB-Donor base station, base station 125 is an IAB-Node base station, and base station 126 is an IAB-Node base station. One or more additional IAB-Node base stations (not illustrated) may connect with one or more of base stations 120 through an F1 interface. One or more User Equipment devices (not illustrated in FIG. 2) may connect with one or more of the base stations illustrated in FIG. 2.

Example Devices

Figure 3:
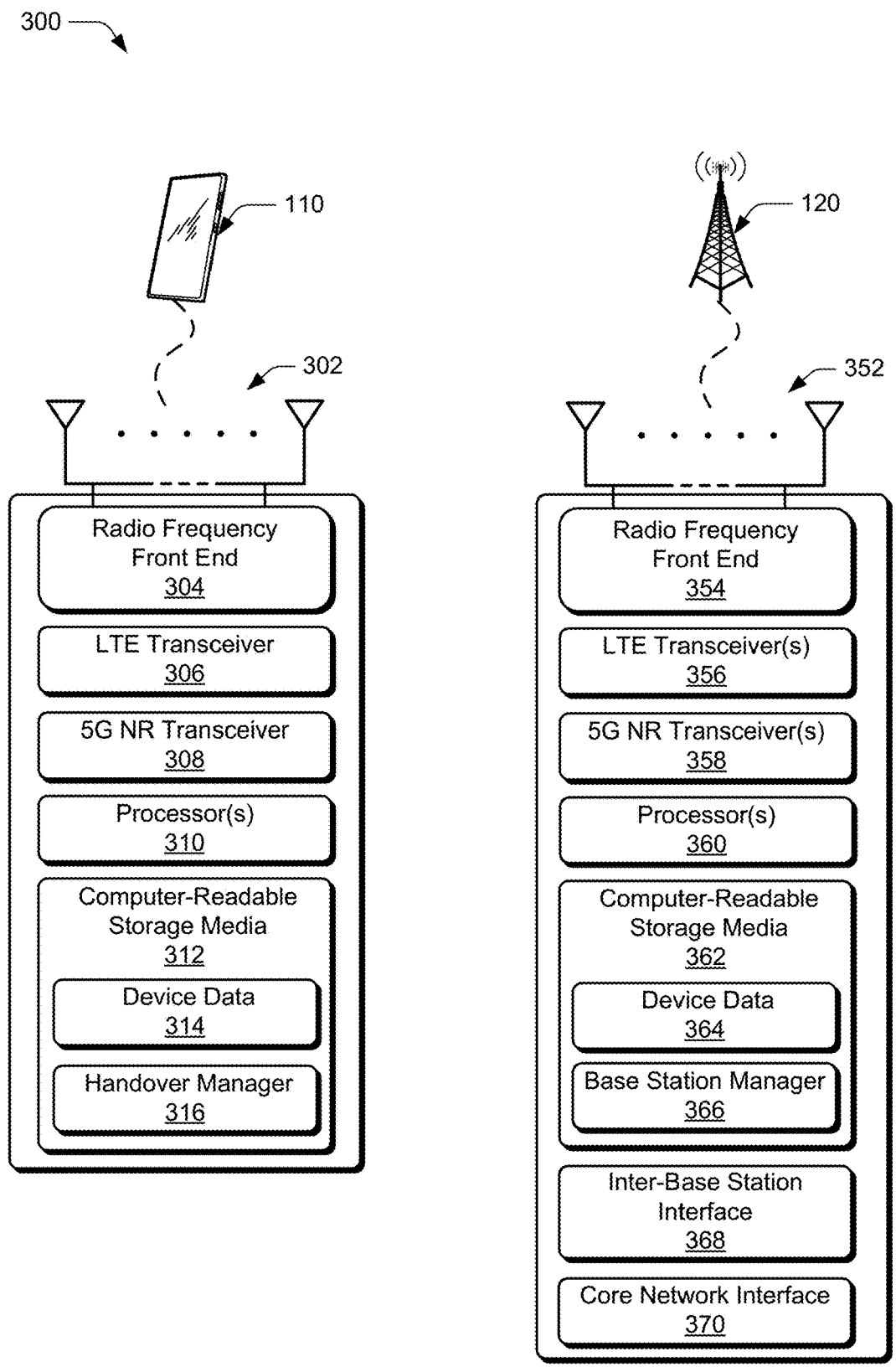
FIG. 3 illustrates an example device diagram that can implement various aspects of maintaining communication and signaling interfaces through a network role transition.

FIG. 3 illustrates an example device diagram 300 of the User Equipment 110 and the base stations 120. The User Equipment 110 and the base stations 120 may include additional functions and interfaces that are omitted from FIG. 3 for the sake of clarity. The User Equipment 110 includes antennas 302, a radio frequency front end 304 (RF front end 304), an LTE transceiver 306, and a 5G NR transceiver 308 for communicating with base stations 120 in the RAN 140. The LTE transceiver 306 and the 5G NR transceiver 308 are hardware-based transceivers. The RF front end 304 of the User Equipment 110 can couple or connect the LTE transceiver 306 and the 5G NR transceiver 308 to the antennas 302 to facilitate various types of wireless communication. The antennas 302 of the User Equipment 110 may include an array of multiple antennas that are configured similarly to or differently from each other. The antennas 302 and the RF front end 304 can be tuned to, and/or be tunable to, one or more frequency bands defined by the 3GPP LTE and 5G NR communication standards and implemented by the LTE transceiver 306 and/or the 5G NR transceiver 308. Additionally, the antennas 302, the RF front end 304, the LTE transceiver 306, and/or the 5G NR transceiver 308 may be configured to support beamforming for the transmission and reception of communications with the base stations 120. By way of example and not limitation, the antennas 302 and the RF front end 304 can be implemented for operation in sub-gigahertz bands, sub-6 GHz bands, and/or above 6 GHz bands that are defined by the 3GPP LTE and 5G NR communication standards.

The User Equipment 110 also includes processor(s) 310 and computer-readable storage medium 312 (CRM 312). The processor 310 may be a single core processor or a multiple core processor composed of a variety of materials, such as silicon, polysilicon, high-K dielectric, copper, and so on. The computer-readable storage medium described herein excludes propagating signals. CRM 312 may include any suitable memory or storage device such as random-access memory (RAM), static RAM (SRAM), dynamic RAM (DRAM), non-volatile RAM (NVRAM), read-only memory (ROM), or Flash memory useable to store device data 314 of the User Equipment 110. The device data 314 includes user data, multimedia data, beamforming codebooks, applications, and/or an operating system of the User Equipment 110, which are executable by processor(s) 310 to enable user-plane communication, control-plane signaling, and user interaction with the User Equipment 110.

In some implementations, the CRM 312 may also include a handover manager 316. The handover manager 316 can communicate with the antennas 302, the RF front end 304, the LTE transceiver 306, and/or the 5G NR transceiver 308 to monitor the quality of the wireless communication links 130. Based on this monitoring, the handover manager 316 can determine to trigger a handover.

The device diagram for the base stations 120, illustrated in FIG. 3, includes a single network node (e.g., a gNode B). The functionality of the base stations 120 may be distributed across multiple network nodes or devices and may be distributed in any fashion suitable to perform the functions described herein. The base stations 120 include antennas 352, a radio frequency front end 354 (RF front end 354), one or more LTE transceivers 356, and/or one or more 5G NR transceivers 358 for communicating with the UE 110. The RF front end 354 of the base stations 120 can couple or connect the LTE transceivers 356 and/or the 5G NR transceivers 358 to the antennas 352 to facilitate various types of wireless communication. The antennas 352 of the base stations 120 may include an array of multiple antennas that are configured similarly to or differently from each other. The antennas 352 and the RF front end 354 can be tuned to, and/or be tunable to, one or more frequency bands defined by the 3GPP LTE and 5G NR communication standards, and implemented by the LTE transceivers 356 and one or more 5G NR transceivers 358. Additionally, the antennas 352, the RF front end 354, the LTE transceivers 356, and/or one or more 5G NR transceivers 358 may be configured to support beamforming, such as Massive-MIMO, for the transmission and reception of communications with the UE 110.

The base stations 120 also include processor(s) 360 and computer-readable storage media 362 (CRM 362). The processor 360 may be a single core processor or a multiple core processor composed of a variety of materials, such as silicon, polysilicon, high-K dielectric, copper, and so on. CRM 362 may include any suitable memory or storage device such as random-access memory (RANI), static RAM (SRAM), dynamic RAM (DRAM), non-volatile RAM (NVRAM), read-only memory (ROM), or Flash memory useable to store device data 364 of the base stations 120. The device data 364 includes network scheduling data, radio resource management data, beamforming codebooks, applications, and/or an operating system of the base stations 120, which are executable by processor(s) 360 to enable communication with the User Equipment 110.

CRM 362 also includes a base station manager 366. Alternately or additionally, the base station manager 366 may be implemented in whole or part as hardware logic or circuitry integrated with or separate from other components of the base stations 120. In at least some aspects, the base station manager 366 configures the LTE transceivers 356 and the 5G NR transceivers 358 for communication with the User Equipment 110, as well as communication with a core network, such as the core network 150, and routing user-plane and control-plane data for joint communication. Additionally, the base station manager 366 may allocate air interface resources and schedule communications for the UE 110 and base stations 120 when the base station 120 is acting as a master base station for the base stations 120.

The base stations 120 include an inter-base station interface 368, such as an Xn and/or X2 interface, which the base station manager 366 configures to exchange user-plane and control-plane data between other base stations 120, to manage the communication of the base stations 120 with the User Equipment 110. The base stations 120 include a core network interface 370 that the base station manager 366 configures to exchange user-plane and control-plane data with core network functions and/or entities.

Figure 4:
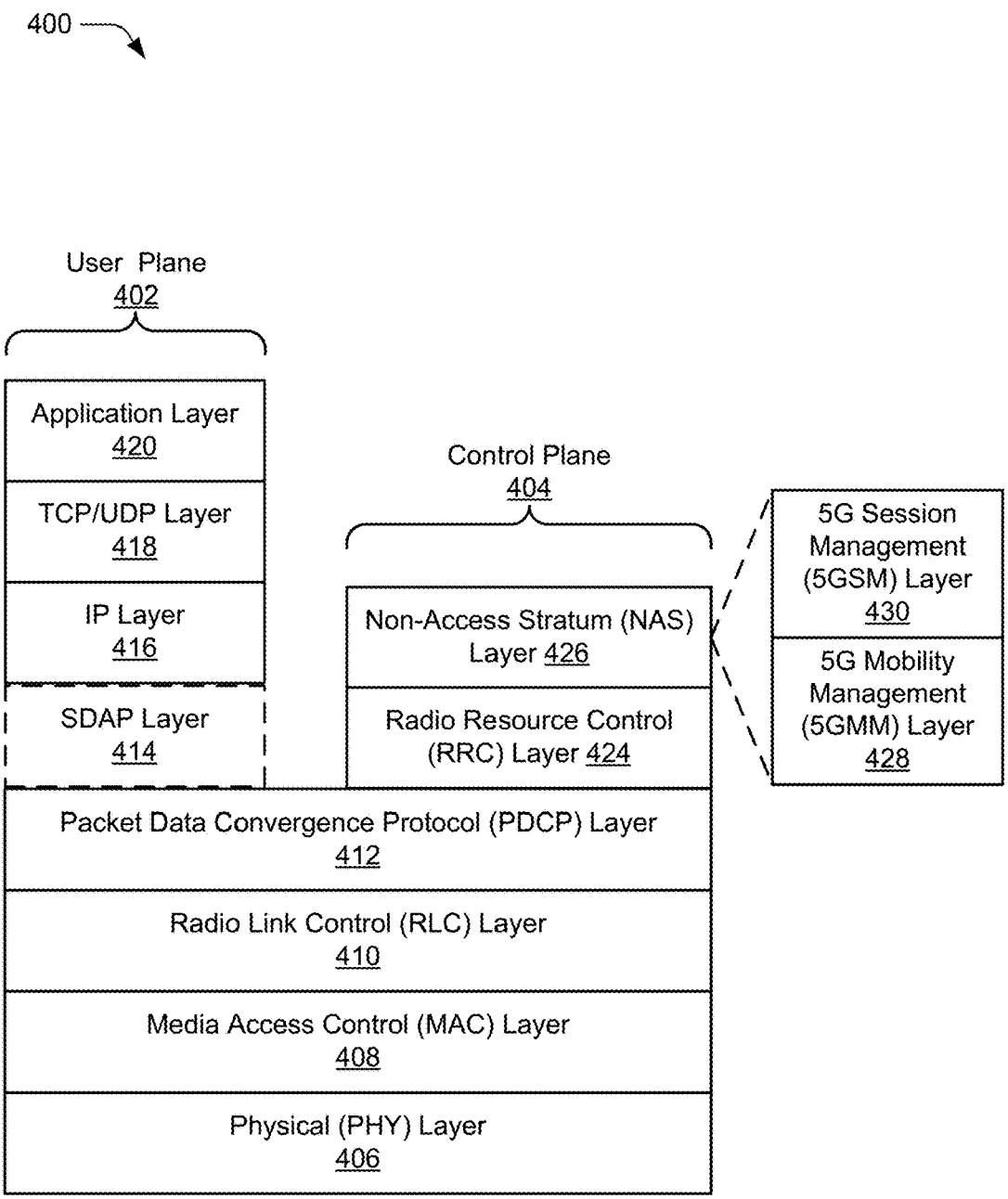
FIG. 4 illustrates an example block diagram from a wireless network stack mode with which various aspects of maintaining communication and signaling interfaces through a network role transition can be implemented.

FIG. 4 illustrates an example block diagram of a wireless network stack model 400 (stack 400). The stack 400 characterizes a communication system for the example environment 100, in which various aspects of maintaining communication and signaling interfaces through a network role transition can be implemented. The stack 400 includes a user plane 402 and a control plane 404. Upper layers of the user plane 402 and the control plane 404 share common lower layers in the stack 400. Wireless devices, such as the UE 110 or the base station 120, implement each layer as an entity for communication with another device using the protocols defined for the layer. For example, a UE 110 uses a Packet Data Convergence Protocol (PDCP) entity to communicate to a peer PDCP entity in a base station 120 using the PDCP.

The shared lower layers include a physical (PHY) layer 406, a Media Access Control (MAC) layer 408, a Radio Link Control (RLC) layer 410, and a PDCP layer 412. The PHY layer 406 provides hardware specifications for devices that communicate with each other. As such, the PHY layer 406 establishes how devices connect to each other, assists in managing how communication resources are shared among devices, and the like.

The MAC layer 408 specifies how data is transferred between devices.

Generally, the MAC layer 408 provides a way in which data packets being transmitted are encoded and decoded into bits as part of a transmission protocol.

The RLC layer 410 provides data transfer services to higher layers in the stack 400. Generally, the RLC layer 410 provides error correction, packet segmentation and reassembly, and management of data transfers in various modes, such as acknowledged, unacknowledged, or transparent modes.

The PDCP layer 412 provides data transfer services to higher layers in the stack 400. Generally, the PDCP layer 412 provides transfer of user plane 402 and control plane 404 data, header compression, ciphering, and integrity protection.

Above the PDCP layer 412, the stack splits into the user plane 402 and the control plane 404. Layers of the user plane 402 include an optional Service Data Adaptation Protocol (SDAP) layer 414, an Internet Protocol (IP) layer 416, a Transmission Control Protocol/User Datagram Protocol (TCP/UDP) layer 418, and an application layer 420, which transfers data using the wireless link 130. The optional SDAP layer 414 is present in 5G NR networks. The SDAP layer 414 maps a Quality of Service (QoS) flow for each data radio bearer and marks QoS flow identifiers in uplink and downlink data packets for each packet data session. The IP layer 416 specifies how the data from the application layer 420 is transferred to a destination node. The TCP/UDP layer 418 is used to verify that data packets intended to be transferred to the destination node reached the destination node, using either TCP or UDP for data transfers by the application layer 420. In some implementations, the user plane 402 may also include a data services layer (not shown) that provides data transport services to transport application data, such as IP packets including web browsing content, video content, image content, audio content, or social media content.

The control plane 404 includes a Radio Resource Control (RRC) layer 424 and a Non-Access Stratum (NAS) layer 426. The RRC layer 424 establishes and releases connections and radio bearers, broadcasts system information, or performs power control. The RRC layer 424 also controls a resource control state of the UE 110 and causes the UE 110 to perform operations according to the resource control state. Example resource control states include a connected state (e.g., an RRC connected state) or a disconnected state, such as an inactive state (e.g., an RRC inactive state) or an idle state (e.g., an RRC idle state). In general, if the UE 110 is in the connected state, the connection with the base station 120 is active. In the inactive state, the connection with the base station 120 is suspended. If the UE 110 is in the idle state, the connection with the base station 120 is released. Generally, the RRC layer 424 supports 3GPP access but does not support non-3GPP access (e.g., Wireless Local Area Network (WLAN) communications).

The NAS layer 426 provides support for mobility management (e.g., using a Fifth-Generation Mobility Management (5GMM) layer 428) and packet data bearer contexts (e.g., using a Fifth-Generation Session Management (5GSM) layer 430) between the UE 110 and entities or functions in the core network, such as the Access and Mobility Management Function 152 (AMF 152) of the 5GC 150 or the like. The NAS layer 426 supports both 3GPP access and non-3GPP access.

In the UE 110, each layer in both the user plane 402 and the control plane 404 of the stack 400 interacts with a corresponding peer layer or entity in the base station 120, a core network entity or function, and/or a remote service, to support user applications and control operation of the UE 110 in the RAN 140.

Integration of CU/DU Architecture and Integrated Access and Backhaul

Figure 5:
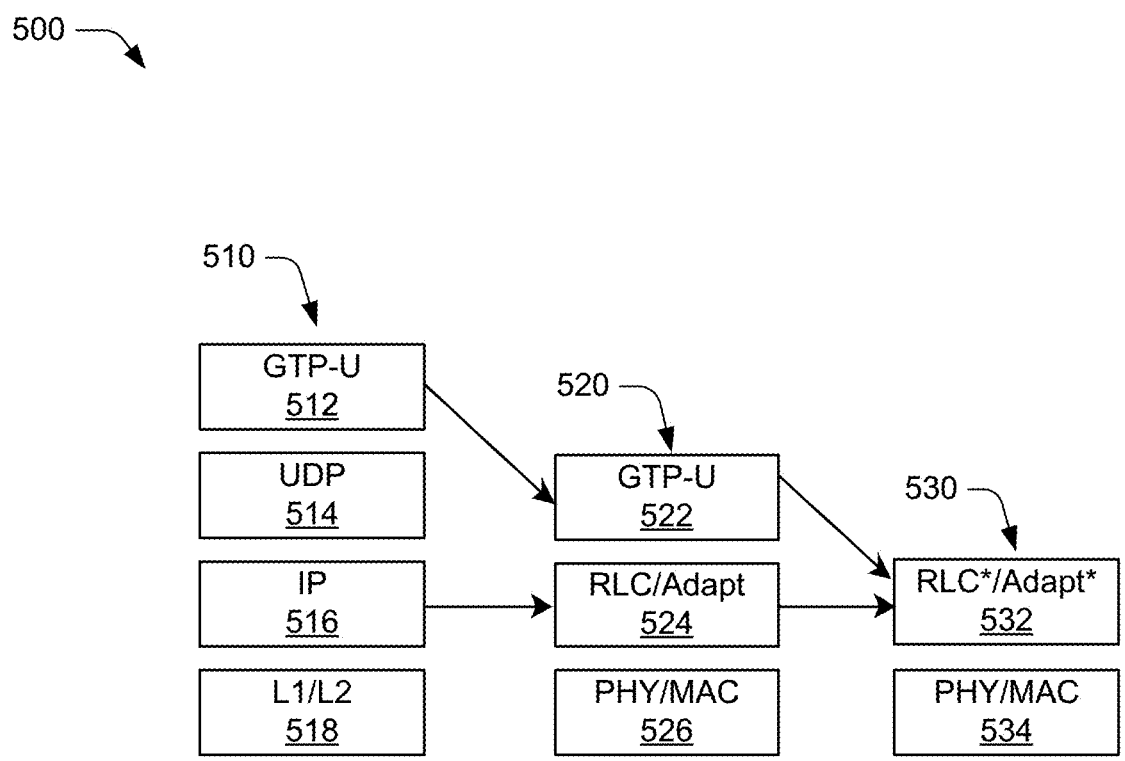
FIG. 5 illustrates example protocol stacks with which various aspects of maintaining communication and signaling interfaces through a network role transition can be implemented.

FIG. 5 illustrates example protocol stacks 500, including an F1 user plane interface (F1-U) protocol stack 510, a first modified F1 user plane interface (F1*-U) protocol stack 520, and a second modified F1 user plane interface (F1*-U) protocol stack 530. Stack 510 includes a GPRS Tunneling Protocol User Plane (GTP-U) header 512, a user datagram protocol (UDP) header 514, an IP layer 516, and a L1/L2 control channel 518. In the first F1*-U protocol stack 520 and in the second F1*-U protocol stack 530, F1*-U runs over RLC-channels on the wireless backhaul between the MT on the serving IAB-Node and the DU on the IAB-Donor. The first F1*-U protocol stack 520 may carry a GTP-U header 522 for the end-to-end association between CU and DU. The first F1*-U protocol stack 520 may include an adaption layer 524, which holds routing information, enabling hop-by-hop forwarding. In the first F1*-U protocol stack 520, a radio link control (RLC) layer/adaption layer 524 (RLC/Adapt 524) replaces the IP functionality 516 of the F1-U protocol stack 510. Protocol stack 520 also includes a physical layer/media access control layer 526 (PHY/MAC 526). The second F1*-U protocol stack 530 includes enhancements to the RLC layer (RLC*) and enhancements to the adaption layer (Adapt*). In stack 530, the adaption layer replaces the IP functionality 516 of the F1-U protocol stack 510. Stack 530 includes an enhanced RLC layer/adaption layer 532 (RLC*/Adapt* 532), which holds routing information, enabling hop-by-hop forwarding. The stack 530 also includes a physical layer/media access control layer 534 (PHY/MAC layer 534). In a further enhancement, in the second F1*-U protocol stack 530, information carried inside the GTP-U header 502 of the F1-U protocol stack 510 may be included in the RLC*/Adapt* layer 532. In stack 520 and stack 530, further optimizations to RLC may be considered, such as applying Automatic Repeat Request (ARQ) only on the end-to-end connection, as opposed to hop-by-hop. The MT of the IAB-Node further sustains NAS connectivity to the 5GC 150 (e.g., for authentication of the IAB-Node). The MT of the IAB-Node further sustains a Protocol Data Unit session via the 5GC 150, e.g., to provide the IAB-Node with connectivity to the Operations, Administration and Management (OAM).

gNB Central Node-Distributed Node Architecture

Figure 6:
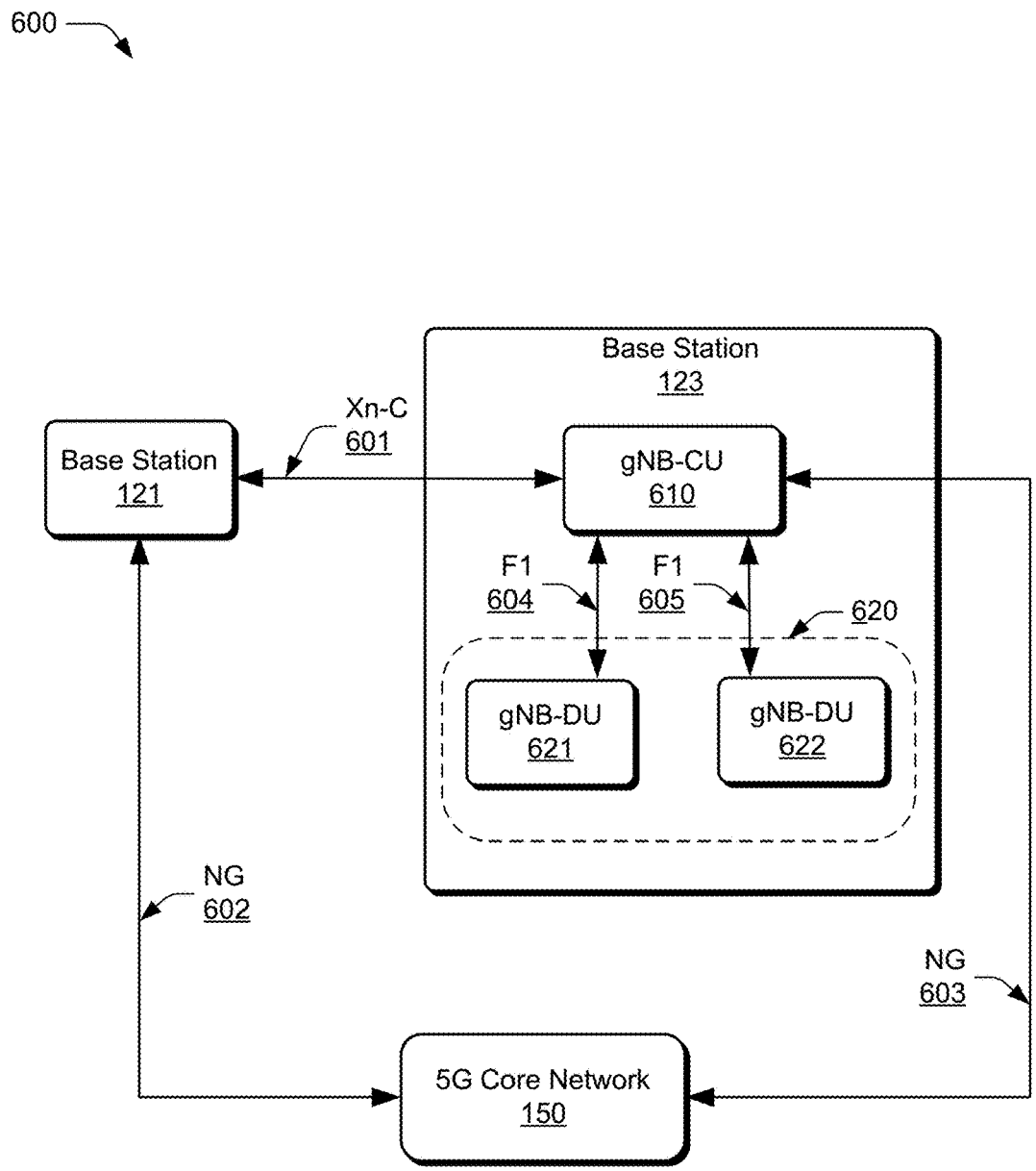
FIG. 6 illustrates an example of a system including a distributed base station implemented in accordance with one or more aspects of maintaining communication and signaling interfaces through a network role transition.

FIG. 6 illustrates an example system 600 generally related to a system including a distributed base station implemented in accordance with one or more aspects of maintaining communication and signaling interfaces through a network role transition. In the system 600, the base station 121 is illustrated as a non-distributed base station and the base station 123 is illustrated as a distributed base station. The base station 123 (an IAB-Donor) includes a gNB-Central Unit 610 (gNB-CU 610) and one or more gNB Distributed-Units 620 (gNB-DU 620) (e.g., IAB-Nodes), illustrated as gNB-DU 621 and 622. Although two gNB-DU 620 are illustrated for the sake of clarity in FIG. 6, any suitable number of gNB-DUs can be interfaces to the gNB-CU 610.

The base stations 121 and 123 communicate through an Xn-C interface 601 for control-plane communications. In the base station 123, the Xn-C interface 601 is terminated by the gNB-CU 610. The base stations 121 and 123 connect, at 602 and 603 respectively, to the 5GC 150 through an NG interface for control-plane signaling.

In the central node-distributed node architecture, the gNB-CU 610 is a logical node hosting the RRC layer 424, the SDAP layer 414, and the PDCP layer 412 entities of the gNB or the RRC layer 424 and the PDCP layer 412 entities of an en-gNB (e.g., a gNB connected to an evolved packet core) that controls the operation of one or more gNB-DUs 620. The gNB-CU 610 includes an F1 interface to communicate with the gNB-DUs 620, shown at 604 and 605. Although described as logical nodes, the gNB-CU 610 and/or the gNB-DUs 620 devices may include any suitable components described with respect to the base station 120 in FIG. 3.

The gNB-DUs 620 are logical nodes hosting the RLC layer 410, MAC layer 408, and PHY layer 406 protocols of the gNB or en-gNB. The operation of the gNB-DUs 620 is partially controlled by gNB-CU 610. One gNB-CU 610 supports one or multiple cells in the RAN 140, but a single cell is only supported by a single gNB-DU 620. Each gNB-DU 620 terminates the F1 interface with the gNB-CU 610 that serves as the Central Unit for that gNB-DU 620. Each gNB-DU 620 connects operationally to only one gNB-CU 610. Alternatively or optionally, for resiliency in network operations, a gNB-DU 620 may be connected to multiple gNB-CUs 610 using any suitable implementation, for example, network interconnection hardware and/or software that provides failover for a gNB-DU 620 to backup gNB-CU 610 if a primary gNB-CU 610 fails or becomes unavailable to the gNB-DU 620. The gNB-DU 620 may communicate with User Equipment (UE) (not illustrated in FIG. 6) through wireless communication links 130, as illustrated in FIG. 1.

In another example of the central node-distributed node architecture, for E-UTRA-NR dual connectivity (EN-DC), the gNB-CU 610 terminates the S1-U and X2-C interfaces for the base station 123 (e.g., an en-gNB). The gNB-CU 610 and connected gNB-DUs 620 are only visible to other base stations 120 and the 5GC 150 or EPC 160 as a gNB.

Inter-gNB DU Mobility for Intra-NR

Figure 7:
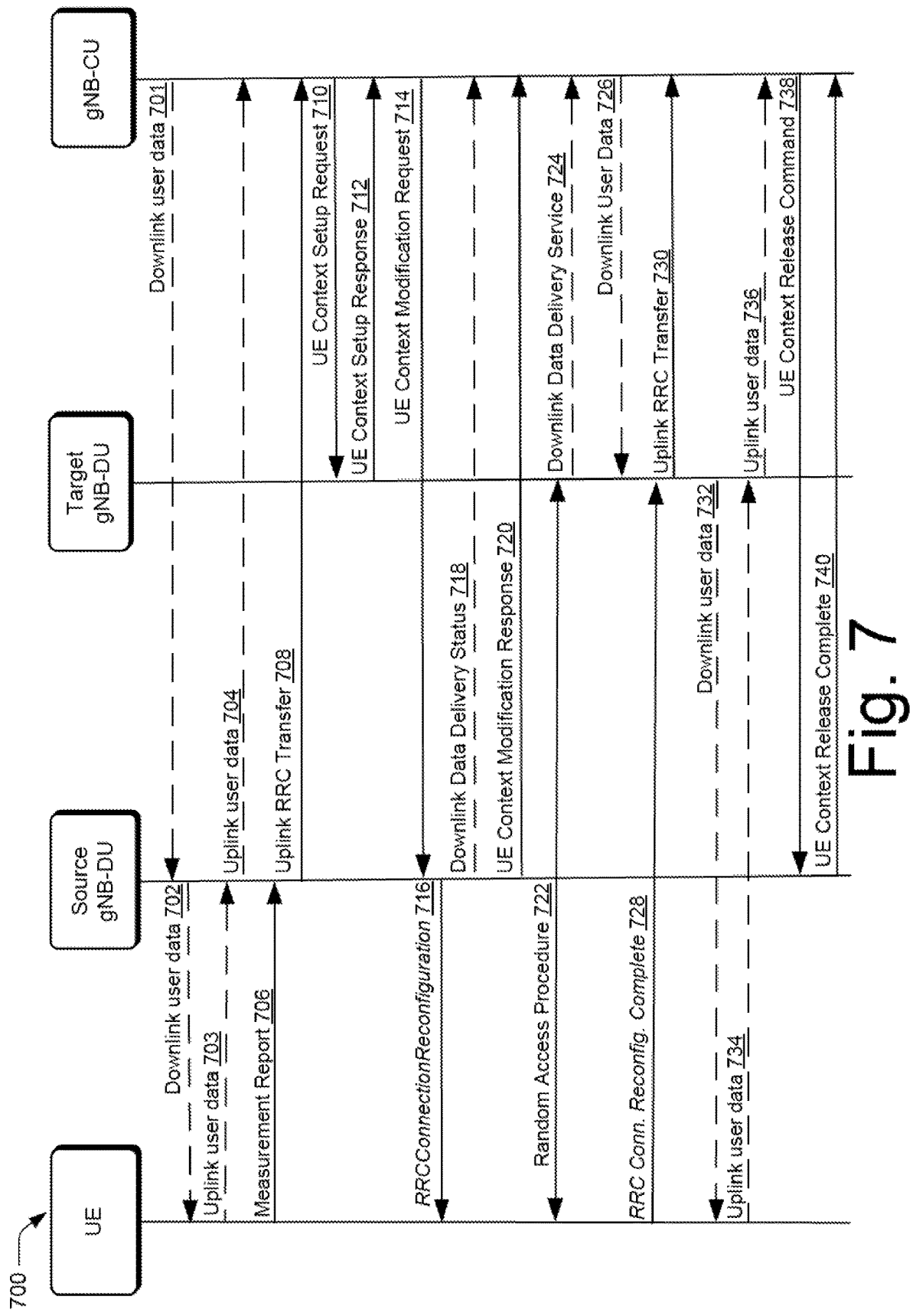
FIG. 7 illustrates an Inter-gNB DU mobility for intra-NR procedure, including data and control transactions between devices, in accordance with one or more aspects of maintaining communication and signaling interfaces through a network role transition.

FIG. 7 illustrates an example of an Inter-gNB DU Mobility for Intra-NR procedure 700 described in 3GPP TS 38.401 v15.3.0. In the procedure 700, the Source gNB-DU may receive downlink user data from the gNB-CU and the UE may receive downlink user data from the Source gNB-DU. The UE 110 may send uplink user data to the Source gNB-DU and the Source gNB-DU may send uplink user data to the gNB-CU. The UE sends a Measurement Report message 706 to the source gNB-DU. The source gNB-DU sends an Uplink RRC Transfer message 708 to the gNB-CU to convey the received Measurement Report. The gNB-CU sends a UE Context Setup Request message 710 to the target gNB-DU to create a UE context and setup one or more bearers. The target gNB-DU responds to the gNB-CU with a UE Context Setup Response message 712. The gNB-CU sends a UE Context Modification Request message 714 to the source gNB-DU, which includes a generated RRCConnectionReconfiguration message and indicates to stop the data transmission for the UE. The source gNB-DU also sends a Downlink Data Delivery Status frame 718 to inform the gNB-CU about the unsuccessfully transmitted downlink data to the UE. The source gNB-DU forwards the received RRCConnectionReconfiguration message to the UE. The source gNB-DU responds to the gNB-CU with the UE Context Modification Response message 720.

A Random Access procedure 722 is performed at the target. The target gNB-DU sends a Downlink Data Delivery Status frame 724 to inform the gNB-CU. Downlink packets 726, which may include PDCP PDUs not successfully transmitted in the source gNB-DU, are sent from the gNB-CU to the target gNB-DU. It is up to gNB-CU implementation whether to start sending DL User Data to gNB-DU before or after reception of the Downlink Data Delivery Status. The UE responds to the target gNB-DU with an RRCConnectionReconfigurationComplete message 728. The target gNB-DU sends an Uplink RRC Transfer message 730 to the gNB-CU to convey the received RRCConnectionReconfigurationComplete message 728. Downlink packets 732 are sent to the UE. Also, uplink packets 734 are sent from the UE, which are forwarded to the gNB-CU through the target gNB-DU. The gNB-CU sends a UE Context Release Command message 738 to the source gNB-DU. The source gNB-DU releases the UE context and responds the gNB-CU with a UE Context Release Complete message 740.

The usage scenario of FIG. 7 does not disclose the concept of handling handover of a Distributed Unit (DU) of IAB-Node and the connected User Equipment (UE) between IAB-Donors, as a typical base station (e.g., eNB, gNB) or gNB-DU is physically fixed and generally connected to one gNB-CU only.

IAB-Architecture with Mobile IAB-Node

Figure 8:
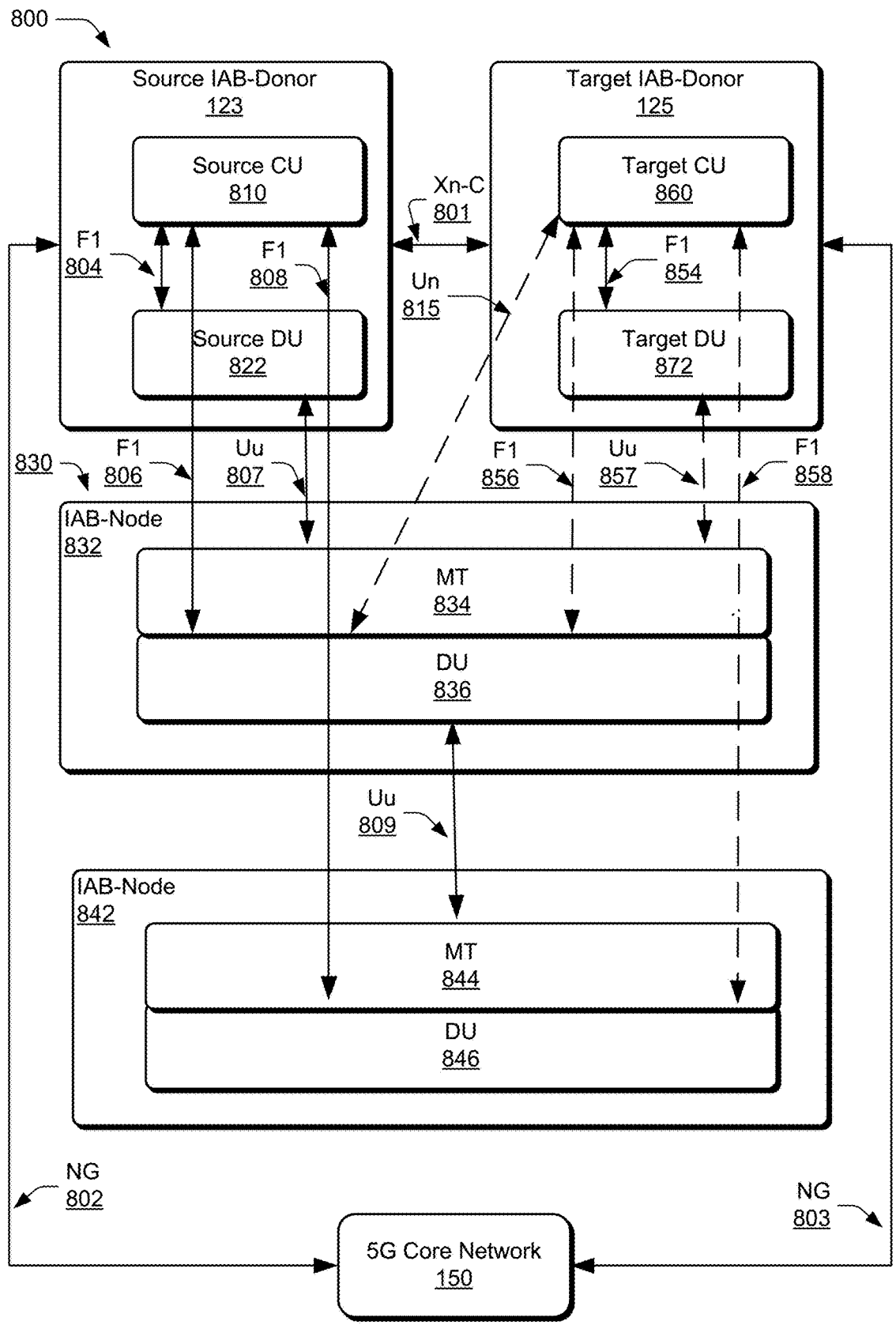
FIG. 8 illustrates an example of a system including a pair of distributed base stations implemented in accordance with one or more aspects of maintaining communication and signaling interfaces through a network role transition.

FIG. 8 illustrates an example system 800 implemented in accordance with one or more aspects of maintaining communication and signaling interfaces during network role transitions. The system 800 illustrated in FIG. 8 leverages the CU/DU-split architecture, which includes a pair of distributed base stations 120 (e.g., Source IAB-Donor 123 (source base station 123), Target IAB-Donor 125 (target base station 125)). The system 800 further illustrates a two-hop chain of IAB-Nodes (832, 842) underneath an IAB-Donor (123).

In the CU/DU-split architecture, an IAB-Donor is treated as a single logical node that includes a set of functions, such as gNB Distributed Unit (gNB-DU), gNB Central Unit (gNB-CU), gNB Central Unit Control Plane (gNB-CU-CP), gNB Central Unit User Plane (gNB-CU-UP), and potentially other functions. In a deployment, an IAB-Donor can be split according to these functions, which can be either collocated or non-collocated as allowed by 3GPP NG-RAN architecture. In aspects, a gNB-CU may be split into gNB-CU-CP, gNB-CU-UP, and other functions. Some of the functions presently associated with the IAB-Donor may be moved outside of the donor in case it becomes evident that they do not perform IAB-specific tasks.

Figure 9:
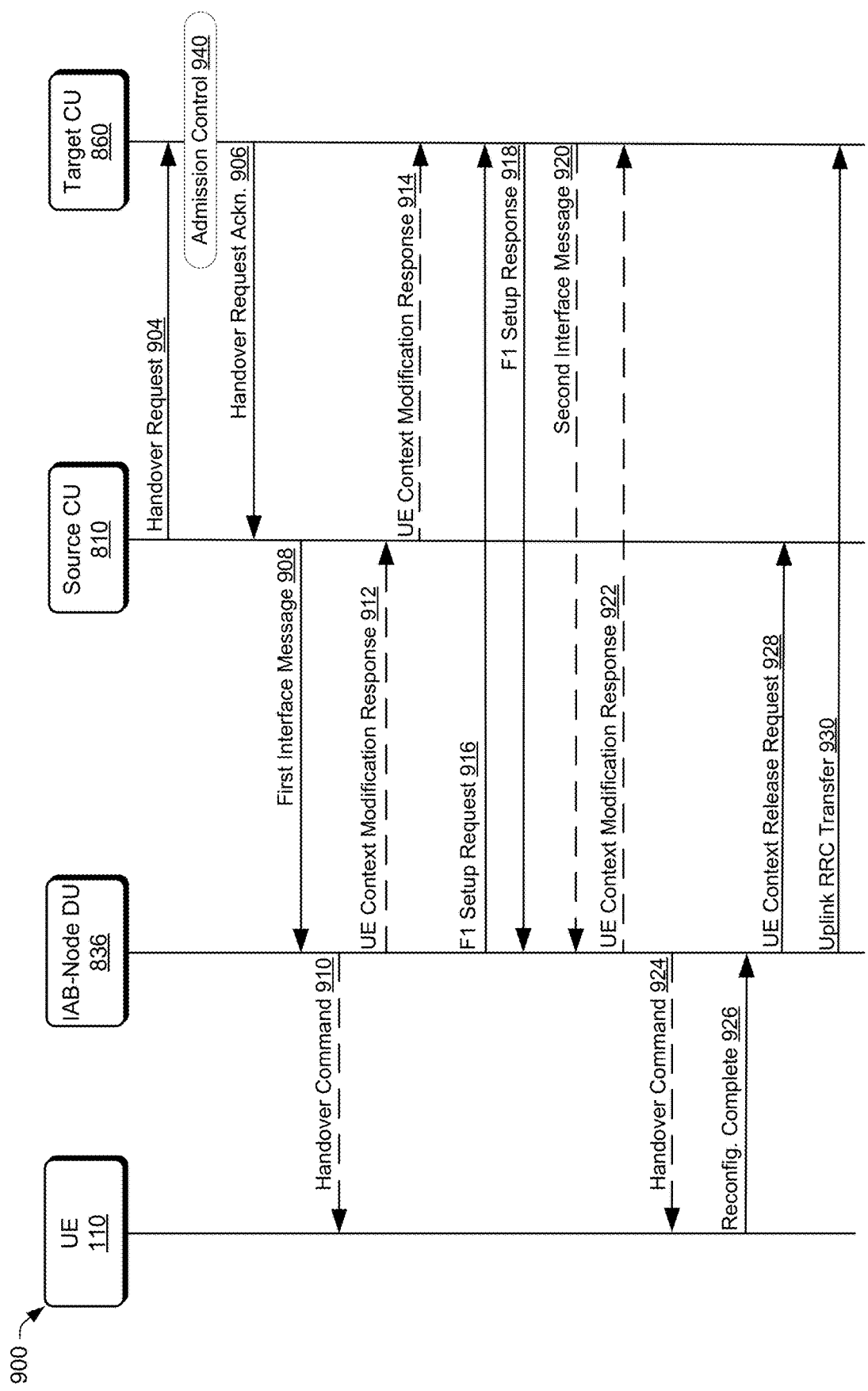
FIG. 9 illustrates an example of F1 Application Protocol Procedures for handover, including data and control transactions between devices, implemented in accordance with one or more aspects of maintaining communication and signaling interfaces through a network role transition.

FIG. 8 illustrates the migration of an IAB-Node from an IAB-Donor DU of a first IAB-Donor CU to an IAB-Donor DU of a second, different, IAB-Donor CU, as further described with respect to the procedure 900 of FIG. 9. FIG. 8 illustrates the topology before the migration as well as the topology after the migration (in dotted line fashion).

Example system 800 is illustrated with a two-hop chain of IAB-Nodes (e.g., IAB-Node 832, IAB-Node 842) underneath an IAB-Donor (e.g., Source IAB-Donor 123), with IAB-Node 832 being an intermediate node between IAB-Node 842 and source base station 123. In such a configuration, IAB-Node 842 is a "subtending" node. While system 800 shows a two-hop chain of IAB-Nodes, in other examples, the system may include one or more IAB-Nodes in series and/or parallel. In system 800, while the Target IAB-Donor 125 is also illustrated as a central node-distributed node architecture distributed base station, no IAB-Nodes are illustrated for Target IAB-Donor 125 in FIG. 8 for the sake of clarity.

In system 800, Source IAB-Donor 123 and Target IAB-Donor 125 communicate through an Xn-C interface 801 (Xn-C 801) for control-plane communications. In the Source IAB-Donor 123, the Xn-C interface 801 is terminated by the Source IAB-Donor Central Unit 810 (Source CU 810). In the Target IAB-Donor 125, the Xn-C interface 801 is terminated by the Target IAB-Donor Central Unit 860 (Target CU 860). The Source IAB-Donor 123 and Target IAB-Donor 125 connect, at NG 802 and NG 803 respectively, to the 5GC 150 through an NG interface for control-plane signaling.

In system 800, the Source IAB-Donor 123 (e.g., IAB-Donor gNB) is illustrated as a central node-distributed node architecture distributed base station. In a central node-distributed node architecture, an IAB-Donor holds a Donor CU (e.g., gNB-CU) for the Distributed Units (DU) of the IAB-Node(s) (e.g., IAB-Node gNB) and for its own donor DU. For example, in system 800, Source IAB-Donor 123 holds the Source CU 810 for the Distributed Units (DU) of the IAB-Nodes (e.g., DU 836 of IAB-Node 832, DU 846 of IAB-Node 842) and for its own DU (e.g., Source DU 822). The DU of an IAB-Node may connect to the CU in the IAB-Donor using a modified form of F1 referred to as F1*. Although three Distributed Units (i.e., Source DU 822, IAB-Node DU 836, IAB-Node DU 846) are illustrated for the sake of clarity in FIG. 8, any suitable number of Distributed Units can be interfaces to the Source CU 810. The IAB-Donor further holds an MT.

A donor Central Unit (CU) terminates the F1 interface towards IAB-Nodes. For example, Source IAB-Donor CU 810 (Source CU 810) terminates the F1 interface 806 towards IAB-Node 832 and Source CU 810 terminates the F1 interface 808 towards IAB-Node 842. A donor CU terminates the F1 interface towards its own donor Distributed Unit (DU). For example, Source CU 810 terminates the F1 interface 804 towards Source DU 822.

In a central node-distributed node architecture, IAB-Nodes may connect to IAB-Donor Distributed Units (DU) via a wireless backhaul link (Uu interface), an IAB-Node may connect via a wireless backhaul link (Uu interface) to one or more IAB-Nodes, and an IAB-Node may connect via a wireless access link (Un interface) to one or more User Equipment.

In a central node-distributed node architecture, an IAB-Donor holds at least one donor Distributed Unit (e.g., gNB-DU) to support the served UEs of the IAB-Donor and to support the Mobile-Termination (MT) function of subtending (downstream) IAB-Nodes. Via the MT function, an IAB-Node connects to an intermediate (upstream) IAB-Node or the IAB-Donor. For example, in system 800, Source IAB-Donor 123 holds Source DU 822 that supports any served UEs of Source IAB-Donor 123 (not illustrated in FIG. 8), Source DU 822 supports the MT function 834 of IAB-Node 832 via a wireless backhaul link 807 (Uu interface 807 (Uu 807)), and the DU 836 of IAB-Node 832 connects via a wireless backhaul link 809 (Uu interface 809 (Uu 809)) with the Mobile-Termination 844 (MT 844) of IAB-Node 842. Via the connected Source DU 822, IAB-Node 832 establishes RLC-channels to UEs and to MTs of subtending IAB-Nodes (e.g., MT 844). For MTs, this RLC-channel may be a modified form of RLC referred to as RLC*.

In the central node-distributed node architecture, the Source CU 810 is a logical node hosting the RRC layer 424, the SDAP layer 414, and the PDCP layer 412 entities of the gNB or the RRC layer 424 and the PDCP layer 412 entities of an en-gNB (e.g., a gNB connected to an evolved packet core) that controls the operation of one or more DUs (e.g., Source DU 822, Target DU 872, IAB-Node DU 836, IAB-Node DU 846). The IAB-Donor CU 810 (Source CU 810) includes an F1 interface to communicate with the DUs, shown at F1 804, F1 806, and F1 808. Although described as logical nodes, the Source CU 810 and/or the DU (e.g., Source DU 822, Target DU 872, IAB-Node DU 836, IAB-Node DU 846) devices may include any suitable components described with respect to the base station 120 in FIG. 3.

The Target IAB-Donor 125 includes a Central Unit 860 (Target CU 860) and a Distributed Unit 872 (Target DU 872). Although one Distributed Unit (Target DU 872) is illustrated as supported by Target CU 860 for the sake of clarity in FIG. 8, any suitable number of DUs can be interfaces to Target CU 860 of Target IAB-Donor 125.

In the central node-distributed node architecture, the Target CU 860 is a logical node hosting the RRC layer 424, the SDAP layer 414, and the PDCP layer 412 entities of the gNB or the RRC layer 424 and the PDCP layer 412 entities of an en-gNB (e.g., a gNB connected to an evolved packet core) that controls the operation of one or more DUs (e.g., Target DU 872). Target CU 860 includes an F1 interface to communicate with the DUs (e.g., Target DU 872), for instance F1 interface 854 (F1 854). Although described as logical nodes, the Target CU 860 and/or the DU (e.g., Target DU 872) devices may include any suitable components described with respect to the base station 120 in FIG. 3.

F1 Application Protocol Procedures for Handover

FIG. 9 illustrates an example of data and control transmissions for an IAB-Node and connected User Equipment (UE) to handover from a Source IAB-Donor to a Target IAB-Donor in accordance with one or more aspects of F1 Application Protocol (F1AP) procedures 900. For example, for the Distributed Unit of an IAB-Node to establish an F1 interface with a Target IAB-Donor CU to achieve handover (e.g., from a Distributed Unit (DU) of a Source IAB-Donor to the DU of the Target IAB-Donor) in a central unit-distributed unit architecture. Utilizing the F1AP procedures 900, the Distributed Unit (e.g., DU 836) of an IAB-Node 832 establishes an F1 Interface with the Central Unit 860

(CU 860) of a Target IAB-Donor 125 (target base station 125) to achieve handover from a Source IAB-Donor 123 (source base station 123).

As illustrated in FIG. 8, the Source IAB-Donor 123 is served by a Source Distributed Unit 822 (Source DU 822) connected to a Source IAB-Donor Central Unit 810 (Source CU 810) and the Target IAB-Donor 125 is served by a Target IAB-Donor Distributed Unit 872 (Target DU 872) connected to a Target Central Unit 860 (Target CU 860). Through a handover procedure, the IAB-Node 832 migrates from the source IAB-Donor 123 to the Target IAB-Donor 125. FIG. 8 illustrates the topology before the migration as well as the topology after the migration. The Source CU 810 holds the DU 836 of the IAB-Node 832. The Source CU 810 connects to DU 836 via F1 interface 806. The DU 836 may support one or more User Equipment devices (not illustrated in FIG. 8) and/or one or more subtending IAB-Nodes (e.g., subtending IAB-Node 842).

The F1 AP procedures 900 illustrated in FIG. 9 include example communications for handover between the entities of FIG. 8, which illustrate the migration of IAB-Node 832 (and the subtending IAB-Node 842 connected to the IAB-Node 832) from the source IAB-Donor 123 (served by Source DU 822) to the Target IAB-Donor 125 (served by Target DU 872). Through migration, the IAB-Node DU 836 is handover from the Source DU 822 to the Target DU 872.

An IAB-Node 830 (e.g., IAB-Node 832) may connect with and support, via wireless links, a plurality of User Equipment (UE) devices. As the radio resource control (RRC) of the UE is also controlled by the same IAB-Donor as the IAB-Node 830, the handover from the Source DU 822 to the Target DU 872 may be applied to the IAB-Node 830 and to the User Equipment (UE) connected with the IAB-Node 830.

The IAB-Node 830 may initiate the F1AP procedures 900 by sending a message to the Source DU 822 requesting handover of the IAB-Node 830 and connected UE 110 from the source IAB-Donor 123 to the target IAB-Donor 125.

Measurement Reporting

Based on the connections of the IAB-Node 830 with the UE 110, instead of the UE 110 performing measurement reporting to trigger the handover, the IAB-Node 830 can be the agent to handle the reporting of measured parameters related to the IAB-Node 830 and to trigger the handover of the IAB-Node 830 (and any connected UE 110) from the Source IAB-Donor 123 (e.g., Source CU 810) to a Target IAB-Donor 125 (e.g., Target CU 860)).

In aspects, the IAB-Node 830 (e.g., Mobile-Termination (MT) 834 of IAB-Node 832) may make measurements of reference signals and other parameters related to the IAB-Node 830. Based on one or more measured parameters related to the IAB-Node 830 and/or other information useful to the Source CU 810 in deciding whether to handover the IAB-Node 830 to another IAB-Donor (collectively "measurement result information"), the IAB-Node 830 decides to trigger the handover of the IAB-Node 830 and User Equipment (UE) connected to the IAB-Node 830 from the Source IAB-Donor 123 (e.g., Source CU 810) to the Target IAB-Donor 125 (e.g., Target CU 860). As a result of this decision, the IAB-Node 830 (e.g., MT 834) generates a Measurement Report message (e.g., a MeasurementReport message). The Measurement Report message may include measurement result information. For example, the IAB-Node 832 may generate a Measurement Report message including one or more measured parameters related to the IAB-Node and/or other measurement result information useful to the Source CU 810 in deciding whether to handover the IAB-Node 830 to another IAB-Donor (e.g., Target IAB-Donor 125).

In aspects, the measurement result information may include location information (e.g., the current location (relative or absolute) of the IAB-Node). In aspects, the measurement result information may include movement information (e.g., the moving speed of the IAB-Node, the moving direction of the IAB-Node). In aspects, the measurement result information may include the measurement results of Reference Signal Received Power (RSRP) and/or the measurement results of Reference Signal Received Quality (RSRQ) of the serving cell and/or neighbor cell perceived by the IAB-Node when the event-based measurement is triggered such as that the neighbor cell signal becomes better or improves. In aspects, the measurement result information may include measurement results obtained by the IAB-Node from another device. For example, a mobile IAB-Node mounted on a vehicle with a fixed commuting route may obtain measurement result information from one or more sensors located on the vehicle.

In aspects, the IAB-Node 830 sends the Measurement Report message to the Source CU 810 via F1 interface 806. In aspects, the Mobile-Termination function 834 (MT 834) of the IAB-Node 832 sends the Measurement Report message to the Source DU 822 via Uu 807 and the Source DU 822 sends the Measurement Report message to the Source CU 810 via F1 interface 804. The Measurement Report message may include measurement result information. The Measurement Report message is effective to request handover. In some aspects, the IAB-Node 832 may send the Measurement Report message to the Source CU 810 upon a triggering event, such as when a pre-configured event is met. For example, upon a vehicle passing a configured check-point A and moving toward the next check-point B (e.g., proximity-based thresholds for events, distance-based thresholds for events) the reporting of measurement result information in a Measurement Report message, from the IAB-Node 830 to the Source CU 810, may be triggered.

As part of the IAB-Node 830, the Mobile-Termination (MT) function has been defined as a component of mobile equipment and is referred to as a function residing on an IAB-Node that terminates the radio interface layers of the backhaul Uu interface toward the IAB-Donor or other IAB-Nodes (e.g., subtending IAB-Nodes). To support the mobility of IAB-Node 830 and the User Equipment 110 connected with the IAB-Node 830, according to the configuration by the radio resource control of the Central Unit Control Plane (CU-CP) in the IAB-Donor, the radio resource control of the Mobile-Termination (e.g., MT 834) in the IAB-Node 830 (e.g., IAB-Node 832) may handle the control of measurement reporting to trigger the handover preparation.

Handover Preparation Triggered by Measurement Result Information

In aspects, based on the measurement result information, the IAB-Node 830 decides to trigger the handover of the IAB-Node 830 and User Equipment (UE) connected to the IAB-Node 830 from the Source IAB-Donor 123 to the Target IAB-Donor 125. The IAB-Node 830 transmits measurement result information to the Source CU 810 in a radio resource control (RRC) Measurement Report message to trigger the handover of the IAB-Node 830 and any User Equipment 110 connected with the IAB-Node 830.

Source CU Initiation of Handover Procedure

Responsive to the Source CU 810 receiving the Measurement Report message, the Source CU 810 may utilize measurement result information within the Measurement Report message to determine whether to initiate handover of the IAB-Node 830 (e.g., IAB-Node 832) from the Source IAB-Donor 123 to another IAB-Donor (e.g., Target IAB-Donor 125). The handover of an IAB-Node from a Source IAB-Donor to a Target IAB-Donor may include handover of any connected User Equipment (UE) devices. The handover of an IAB-Node from a Source IAB-Donor to a Target IAB-Donor may include handover of subtending IAB-Nodes and User Equipment devices connected to such subtending IAB-Nodes.

Responsive to determining to initiate handover, the Source CU 810 generates and sends a Handover Request message 904 to the Target CU 860 requesting preparation of resources for handover. In aspects, the Handover Request message 904 may carry current configuration information from the Source IAB-Donor 123. The configuration information in the Handover Request message 904 may include handover preparation information (e.g., in a HandoverPreparationInformation message). The handover preparation information may include at least one of: IAB-Node capability information, IAB-Node Radio Access Network (RAN) context information, capability information for one or more connected User Equipment (UE), context information for one or more connected UE, Source IAB-Donor configurations related to the IAB-Node and the User Equipment connected to the IAB-Node (e.g., current radio resource control, other Layer 2 configurations), the source radio resource configuration of the IAB-Donor and the IAB-Node, or the source radio resource configuration of one or more connected UE. In aspects, the Handover Request message 904 further carries measurement result information (e.g., a Measurement Result message received from the IAB-Node).

Target CU Acceptance of Handover

Responsive to receiving the Handover Request message 904, the Target CU 860 may perform an Admission Control procedure 940 to decide whether to accept handover of the IAB-Node 832 (e.g., to validate that sufficient resources are available to receive the IAB-Node and any connected UE).

In aspects, if the Target CU 860 accepts the handover, the Target CU 860 utilizes the handover preparation information to determine a configuration type and the Target CU 860 decides whether to perform delta configuration based on the current configuration from the Source CU 810 or whether to perform full configuration. Where the determined configuration type is a delta configuration, the Target CU 860 performs a delta configuration change based on the current configuration received from the Source CU 810 and generates a Handover Request Acknowledgement message 906 that may include the current configuration from the handover preparation information. Where the determined configuration type is a full configuration, the Target CU 860 performs a full configuration, generates a Handover Request Acknowledgement message 906 that does not include the current configuration from the handover preparation information. The Handover Request Acknowledgement message 906 informs the Source CU 810 about the prepared resources at the Target IAB-Donor 125 (e.g., Target CU 860).

In aspects, if the Target CU 860 accepts the handover, the Target CU 860 generates a Handover Command message (e.g., RRC Reconfiguration message, RRCConnectionReconfiguration message) for the IAB-Node 832 (and connected UE) to handover to the Target IAB-Donor 125 (e.g., Target CU 860). The Handover Command message may include one or more of a master cell group (MCG) configuration or a secondary cell group (SCG) configuration. The Target CU 860 may generate the Handover Command message using configuration type determined.

In aspects, the Handover Command message includes the RRC configuration of the IAB-Node 832. In aspects, the Handover Command message includes the RRC configuration of the IAB-Node 832 and the UE 110 connected to the IAB-Node 832. In aspects, the Handover Command message directs subtending IAB-Nodes (e.g., subtending IAB-Node 842) held by the IAB-Node 832 to handover to the Target IAB-Donor 125 (e.g., Target CU 860). In aspects, a Handover Command message for subtending IAB-Nodes may include the RRC configuration of the subtending IAB-Nodes. In aspects, a second Handover Command message directs subtending IAB-Nodes (e.g., subtending IAB-Node 842) held by the IAB-Node 832 to handover to the Target IAB-Donor 125 (e.g., Target CU 860) and the second Handover Command message includes the RRC configuration of the subtending IAB-Nodes. In aspects, the Handover Command message directs UE 110 connected to the IAB-Node 830 to perform a handover procedure and handover to the Target IAB-Donor 125 (e.g., Target CU 860). The Handover Command message for the connected UE 110 may include the RRC configuration of the UE 110 connected to the IAB-Node 830. The Handover Command message for the connected UE 110 may include one or more UE RRC Reconfiguration messages, since the related UE configurations will be handled by the Target IAB-Donor CU-CP after the handover.

The Target CU 860 sends the Handover Command message (e.g., RRC Reconfiguration message) to the Source CU 810 in the Handover Request Acknowledgement message 906. If handover to the Target IAB-Donor 125 (e.g., Target CU 860) fails (e.g., the Target CU 860 does not admit at least one PDU session resource, a failure occurs during the Handover Preparation), the Target CU 860 may communicate the failure to the Source CU 810 in a Handover Preparation Failure message. In aspects, the Handover Preparation Failure message includes a cause value to enable the Source CU 810 to determine the reason for the failure to handover.

First Interface Message

In aspects, responsive to receiving the Handover Request Acknowledgement message 906, the Source CU 810 may generate and send a first interface message 908 to the IAB-Node DU 836 over the existing F1 interface 806 between the Source CU 810 and the IAB-Node DU 836. The first interface message 908 notifies the IAB-Node DU 836 about the handover decision.

Source CU-Initiated UE Context Setup Procedure

In aspects, the first interface message 908 initiates a UE Context Setup procedure for establishing or modifying the UE Context (e.g., signaling radio bearer (SRB), data radio bearer (DRB)). For example, the first interface message 908 may carry a UE Context Modification Request message directing modification of the UE Context. The UE Context Modification Request message may include configuration information.

In response to receiving the first interface message 908 including a UE Context Modification Request message, IAB-Node DU 836 may perform the modifications requested in the UE Context Modification Request message (e.g., establishing radio resources, modifying radio resources, releasing radio resources, suspending data transmission for the UE) for UE supported by the IAB-Node 830.

If the IAB-Node DU 836 succeeds in performing the UE context modifications, the IAB-Node DU 836 may generate and send a UE Context Modification Response message 912 to the Source CU 810 as a confirmation of the UE context modification (e.g., indicating a successful update of the UE context). If the UE context modifications cannot be performed successfully, the IAB-Node DU 836 may communicate the failure to the Source CU 810 in a UE Context Modification Failure message, which includes an appropriate cause value to enable the Source CU 810 to determine the reason for the UE context modification failure. Alternatively, rather than performing a UE Context Setup procedure, the DU 836 may keep the UE context already established. If the Source CU 810 made the UE context modifications on behalf of the Target CU 860, the Source CU 810 may forward any UE Context Modification Response messages 912 received from the IAB-Node DU 836 to the Target CU 860 in a UE Context Modification Response message 914.

First Interface Message Radio Resource Control

In aspects, the first interface message 908 may carry one or more Radio Resource Control (RRC) messages (e.g., Handover Command message, RRC Reconfiguration message) for UE. In aspects, RRC messages carried in the first interface message 908 include one or more of an RRC Handover Command message for UE 110 connected to the IAB-Node 832 to perform handover to the Target IAB-Donor 125, an RRC Handover Command message for the UE 110 connected to subtending IAB-Nodes (e.g., IAB-Node 842) to perform handover to the Target IAB-Donor 125, or an RRC Handover Command message for the IAB-Node 832 to perform handover to the Target IAB-Donor 125.

Responsive to receiving one or more Handover Command messages in a first interface message 908 from the Source CU 810, the IAB-Node DU 836 generates and sends an RRC Handover Command message 910 to the UE 110 to perform handover to the Target IAB-Donor 125. The Handover Command message 910 may include one or more RRC messages (e.g., Handover Command message, RRC Reconfiguration message) carried by the first interface message 908.

Transport Network Layer Connection Setup/Wireless Backhaul Link Implementation

In aspects, the first interface message 908 includes configuration information. The configuration information may include information about the Target CU 860 and/or Operations, Administration and Maintenance related (OAM-related) information. Optionally, the Source CU 810 may provide configuration information in a message to the IAB-Node 832 (e.g., IAB-Node DU 836) separate from the first interface message 908.

Responsive to receiving the configuration information, the IAB-Node DU 836 performs a TNL connection setup procedure and creates Transport Network Layer (TNL) connectivity toward the Target CU 860. After creating TNL connectivity toward the Target CU 860, the IAB-Node DU 836 implements a wireless backhaul link 815 (Un 815) with the Target CU 860 utilizing the TNL connectivity.

F1 Setup Procedure

In aspects, the first interface message 908 includes a modification request including information (e.g., radio bearers to be setup, radio bearers to be modified, radio bearers to be released) for setting up an F1 interface between Target CU 860 and the IAB-Node DU 836, even if that F1 interface has not yet been set up between them.

Responsive to receiving the first interface message 908 and having created Transport Network Layer (TNL) connectivity toward the Target CU 860, the IAB-Node DU 836 may initiate a F1 setup procedure with the Target CU 860 by generating and sending a F1 Setup Request message 916 to the Target CU 860 via the wireless backhaul link 815 (Un 815) implemented utilizing the TNL connectivity. Via the F1 setup procedure, the IAB-Node DU 836 and the Target CU 860 exchange the application layer configuration data for the IAB-Node DU 836 and the Target CU 860 to correctly interoperate on the F1 interface. The IAB-Node DU 836 and the Target CU 860 exchange this application layer configuration data via the wireless backhaul link 815 (Un 815). Utilizing the application layer configuration data, a second F1 interface 856 is set up between the Target CU 860 and the DU 836 of IAB-Node 832. This is different from a typical F1 Control Plane Protocol (F1-C) structure, such as illustrated in FIG. 4, which is on top of Transport Network Layer (TNL) based on wireline IP transport, Stream Control Transmission Protocol (SCTP) on top of IP.

In response to receiving the F1 Setup Request message 916, the Target CU 860 may generate and send a F1 Setup Response message 918 to the IAB-Node DU 836 via the wireless backhaul link 815 (Un 815) including IAB-Node DU application layer configuration data as confirmation of setup of the F1 interface.

Packet Routing Information

For the F1 Application Protocol (F1AP) residing in the IAB-Node 830, the F1AP may be protected (e.g., encrypted) by the Packet Data Convergence Protocol (PDCP) layer of the co-located MT entity (e.g., MT 834). Packet routing information may be handled by the adaption layer to reach the IAB-Donor CU correctly. The packet routing information may include an identifier for the next hop (subtending) IAB-Node (IAB-Node ID) in the chain of IAB-Nodes, the identifiers for the IAB-Node IDs all the way toward the IAB-Donor, and/or an identifier for the IAB-Donor (IAB-Donor ID) if no intermediate IAB-Nodes exist between the IAB-Node and the IAB-Donor.

Second Interface Message

In aspects, the Target CU 860 may generate and send a second interface message 920 to the IAB-Node DU 836 via the second F1 interface 856. The second interface message 920 notifies the IAB-Node DU 836 about the handover decision and initiates a UE Context Setup procedure for establishing or modifying the UE Context (e.g., signaling radio bearer (SRB), data radio bearer (DRB)). For example, the second interface message 920 may carry a UE Context Modification Request message directing modification of the UE context. The UE Context Modification Request message may include configuration information.

Target CU-Initiated UE Context Setup Procedure

In response to receiving a second interface message 920 including a UE Context Modification Request message, IAB-Node DU 836 may perform the modifications requested in the UE Context Modification Request message (e.g., establishing radio resources, modifying radio resources, releasing radio resources, suspending data transmission for the UE) for UE supported by the IAB-Node 830. If the IAB-Node DU 836 succeeds in performing the UE context modification, the IAB-Node DU 836 generates and sends a UE Context Modification Response message 922 to the Target CU 860 via the second F1 interface 856 as a confirmation of the UE context modification (e.g., indicating a successful update of the UE context). If the IAB-Node DU 836 fails to successfully establish the UE context, such as failing to establish the DRB and/or the SRB, the IAB-Node DU 836 includes a cause value in the UE Context Modification Failure message to enable the Target CU 860 to determine the reason for the failure to establish the UE Context. Alternatively, rather than performing a UE Context Setup procedure, the IAB-Node DU 836 may keep the UE Context already established.

If the Source CU 810 performed UE Context Modification on behalf of the Target CU 860 (e.g., in response to receiving a first interface message 908 from the Source CU 810) before the second F1 interface 856 was set up, then the second interface message 920 and/or UE Context Modification Response message 922 may not be necessary.

In aspects, the second interface message 920 includes information about the Target CU 860 and/or OAM-related information. Optionally, the Target CU 860 may provide information about the Target CU 860 and/or OAM-related information in a message to the IAB-Node 832 (e.g., IAB-Node DU 836) separate from the second interface message 920. Optionally, the Target CU 860 may provide configuration information in a message to the IAB-Node 832 (e.g., IAB-Node DU 836) separate from the second interface message 920.

Second Interface Message Radio Resource Control

In aspects, the second interface message 920 may carry one or more RRC messages (e.g., Handover Command message, RRC Reconfiguration message) for one or more connected User Equipment 110 (UE 110). In aspects, the RRC messages carried in the second interface message 920 include a Handover Command message for the UE 110 connected to the IAB-Node 832 to perform handover to the Target IAB-Donor 125. In aspects, the RRC messages carried in the second interface message 920 include an RRC Handover Command message for the UE 110 connected to subtending IAB-Nodes to perform handover to the Target IAB-Donor 125. In aspects, the RRC messages carried in the second interface message 920 include an RRC Handover Command message for the IAB-Node 832 to perform handover to the Target IAB-Donor 125.

Handover Command Message

Responsive to receiving one or more Handover Command messages in a second interface message 920 from the Target CU 860, the IAB-Node DU 836 generates and sends a Handover Command message 924 to the UE 110 to perform handover to the Target IAB-Donor 125. The Handover Command message 924 may include one or more RRC messages (e.g., Handover Command, RRC Reconfiguration) carried by the second interface message 920.

UE RRC Reconfiguration

In aspects, the UE 110 perform RRC Reconfiguration and handover to the Target IAB-Donor 125 responsive to receiving the Handover Command message 910 from the IAB-Node DU 836. In aspects, the UE 110 perform RRC Reconfiguration and handover to the Target IAB-Donor 125 responsive to receiving the Handover Command message 924, including RRC Reconfiguration messages, from the IAB-Node DU 836. Upon completion of RRC Reconfiguration by the UE 110, the UE 110 may generate and send one or more UE RRC Reconfiguration Complete messages 926 to the IAB-Node DU 836 as a confirmation of UE RRC Reconfiguration.

UE Context Release

After the IAB-Node DU 836 receives a corresponding UE Reconfiguration Complete message 926 from the UE 110, the IAB-Node DU 836 generates and sends a UE Context Release Request message 928 to the Source CU 810 for the purpose of releasing the UE context stored at the Source CU 810. In response to receiving the UE Context Release Request message 928, the Source CU 810 releases the UE context. The Source CU 810 may generate and send a message to the IAB-Node DU confirming release of the UE context.

Confirmation of UE Handover

In aspects, the IAB-Node DU 836 confirms handover of the connected UE to the Target CU. For example, the IAB-Node DU 836 may receive one or more UE Reconfiguration Complete messages 926 from connected UE 110 as confirmation of handover.

RRC Connection Reconfiguration Complete

In aspects, the IAB-Node DU 836 forwards one or more UE Reconfiguration Complete messages 926 received from the UE 110, via one or more Uplink RRC Transfer messages 930 (e.g., RRC Connection Reconfiguration Complete message), to the Target CU 860 for the purpose of finishing the handover procedure for the corresponding UE 110. The Uplink RRC Transfer message 930 may carry one or more UE Reconfiguration Complete messages 926 received from the UE 110. After all UE 110 connected to the IAB-Node DU 836 have successfully handover to the Target CU 860, the IAB-Node DU 836 can regard itself (and all UE 110 connected to it) as successfully handover to the Target CU 860 and the IAB-Node DU 836 can release the related connection and interface with the Source CU 810, including the F1 interface 806.

As a result of the handover, Target IAB-Donor 125 holds Target DU 872 that supports connected UE (e.g., UE 110) and the Mobile-Termination of subtending IAB-Nodes (e.g., MT 834, MT 844). Target IAB-Donor 125 further holds the Target CU 860 for the DUs of the IAB-Nodes (e.g., DU 836 of IAB-Node 832, DU 846 of IAB-Node 842) and for its own DU (e.g., Target DU 872). The Target IAB-Donor 125, through Target DU 872, connects over a second F1 interface 856 to IAB-Node 832 including IAB-Node DU 836, as set up during the F1 setup procedure described with respect to FIG. 9. The Target IAB-Donor 125, through Target CU 860, connects over a F1 interface 858 to IAB-Node 842 including IAB-Node DU 846, as set up during the F1 setup procedure described with respect to FIG. 8. The MT 834 of the IAB-Node 832 connects the IAB-Node 832 to the Target DU 872 of the Target IAB-Donor 125 over a backhaul Uu interface 857 (Uu 857). Through the handover, the backhaul Uu interface 809 (Uu 809) between the MT 844 of the IAB-Node 842 and the DU 836 of IAB-Node 832 is preferably maintained.

Radio Resource Control Signaling Procedures for Handover

Figure 10:
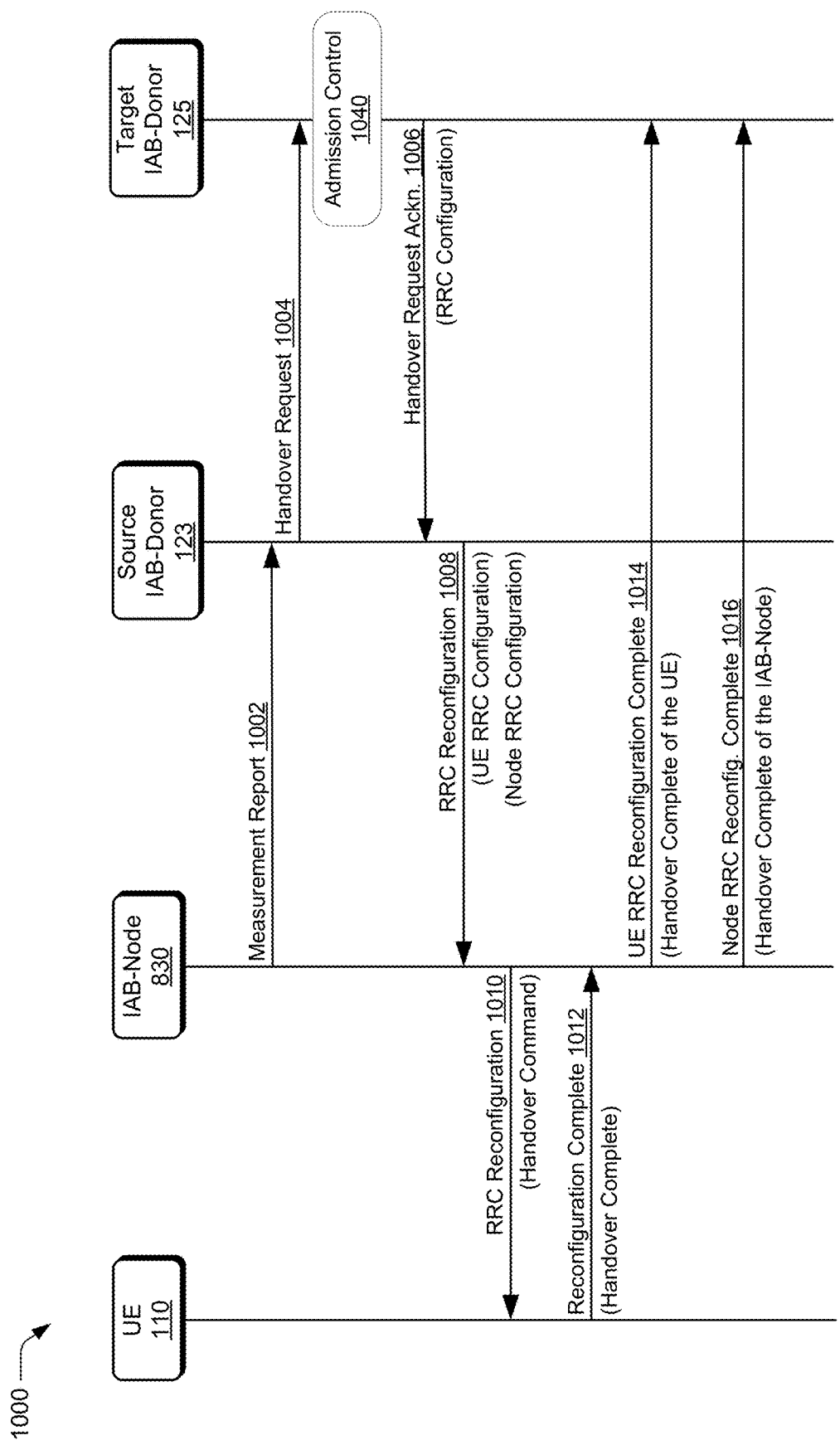
FIG. 10 illustrates an example of radio resource control (RRC) signaling procedures for handover, including data and control transactions between devices, implemented in accordance with one or more aspects of maintaining communication and signaling interfaces through a network role transition.

FIG. 10 illustrates an example of data and control transmissions for an IAB-Node (node base station) and connected User Equipment (UE) to handover from a Source IAB-Donor (source donor base station) to a Target IAB-Donor (target donor base station) in accordance with one or more aspects of radio resource control (RRC) signaling procedures 1000 for maintaining signaling interfaces through a network role transition. Utilizing the RRC signaling procedures 1000, an IAB-Node 830 and connected UE 110 are handover from a Source IAB-Donor 123 (source base station 123) to a Target IAB-Donor 125 (target base station 125).

An IAB-Node 830 may connect with and support, via wireless links, a plurality of User Equipment 110 (UE 110) devices. As the radio resource control (RRC) of the UE is also controlled by the same IAB-Donor as the IAB-Node, the handover from Source IAB-Donor 123 to the Target IAB-Donor 125 may be applied to the IAB-Node 830 and the UE 110 connected with the IAB-Node 830. In aspects, the handover of an IAB-Node 830 from a Source IAB-Donor 123 to a Target IAB-Donor 125 may be applied to subtending IAB-Nodes and User Equipment devices connected to such subtending IAB-Nodes.

The IAB-Node 830 may initiate the RRC signaling procedures 1000 by sending a message to the Source IAB-Donor 123 requesting handover of the IAB-Node 830 and connected UE 110 from the Source IAB-Donor 123 to the Target IAB-Donor 125.

Measurement Reporting

Based on the connections of the IAB-Node 830 with the UE 110, instead of the UE 110 performing measurement reporting to trigger the handover, the IAB-Node 830 can be the agent to handle the reporting of measured parameters related to the IAB-Node 830. An IAB-Node 830 may make measurements of reference signals and other parameters related to the IAB-Node 830. Based on one or more measured parameters related to the IAB-Node 830 and/or other information useful to the Source IAB-Donor 123 in deciding whether to handover the IAB-Node 830 to another IAB-Donor 125 (collectively "measurement result information"), the IAB-Node 830 may generate a Measurement Report message 1002 (e.g., a MeasurementReport message). The Measurement Report message 1002 may include measurement result information. For example, the Mobile-Termination function (MT) 834 of IAB-Node 830 may generate a Measurement Report message 1002 including one or more measured parameters related to the IAB-Node and/or other measurement result information useful to the Source IAB-Donor 123 in deciding whether to handover the IAB-Node 830 to another IAB-Donor (e.g., Target IAB-Donor 125).

In aspects, the measurement result information may include location information (e.g., the current location (relative or absolute) of the IAB-Node). In aspects, the measurement result information may include movement information (e.g., the moving speed of the IAB-Node, the moving direction of the IAB-Node). In aspects, the measurement result information may include the measurement results of Reference Signal Received Power (RSRP) and/or the measurement results of Reference Signal Received Quality (RSRQ) of the serving cell and/or neighbor cell perceived by the IAB-Node when the event-based measurement is triggered such as that the neighbor cell signal becomes better or improves. In aspects, the measurement result information may include measurement results obtained by the IAB-Node from another device. For example, a mobile IAB-Node mounted on a vehicle with a fixed commuting route may obtain measurement result information from one or more sensors located on the vehicle.

Triggering Handover Preparation

Based on the measurement result information, the IAB-Node 830 decides to trigger the handover of the IAB-Node 830 and User Equipment (UE) connected to the IAB-Node 830 from the Source IAB-Donor 123 to the Target IAB-Donor 125. The IAB-Node 830 may send the Measurement Report message 1002 to the Source IAB-Donor 123. The Measurement Report message 1002 may include measurement result information.

In some aspects, the Measurement Report message 1002 is sent upon the occurrence of a triggering event, such as when an event (e.g., a pre-configured event) is met. For example, upon a vehicle passing a configured check-point A and moving towards a next check-point B (e.g., proximity-based thresholds for events, distance-based thresholds for events) may trigger the reporting of measurement result information in a Measurement Report message 1002, from the IAB-Node 830 to the Source IAB-Donor 123.

To support the mobility of the IAB-Node 830 and the User Equipment 110 connected with the IAB-Node 830, according to the configuration by the radio resource control of the Central Unit Control Plane (CU-CP) in the IAB-Donor, the radio resource control of the Mobile-Termination in the IAB-Node 830 handles the control of measurement reporting to trigger the handover preparation. Therefore, the IAB-Node 830 transmits measurement result information to the Source IAB-Donor 123 in a radio resource control Measurement Report message 1002 to trigger the handover of the IAB-Node 830 and the User Equipment 110 connected with the IAB-Node 830.

Source Central Unit Initiation of Handover Procedure

Responsive to the Source IAB-Donor 123 receiving the Measurement Report message 1002, the Source IAB-Donor 123 may utilize measurement result information within the Measurement Report message 1002 in determining whether to initiate handover of the IAB-Node 830 from the Source IAB-Donor 123 to another IAB-Donor (e.g., Target IAB-Donor 125). The handover of an IAB-Node 830 from Source IAB-Donor 123 to a Target IAB-Donor 125 may include handover of connected User Equipment 110 (UE 110) devices. The handover of an IAB-Node 830 from a Source IAB-Donor 123 to a Target IAB-Donor 125 may include handover of subtending IAB-Nodes (e.g., IAB-Node 842) and UE 110 connected to such subtending IAB-Nodes.

Responsive to determining to initiate handover, the Source IAB-Donor 123 generates and sends a Handover Request message 1004 to the Target IAB-Donor 125 requesting preparation of resources for handover. In aspects, the Handover Request message 1004 may carry configuration information. In aspects, the configuration information in the Handover Request message 1004 includes handover preparation information (e.g., in a HandoverPreparationInformation message). The handover preparation information may include at least one of: IAB-Node capability information, IAB-Node Radio Access Network (RAN) context information, capability information for one or more connected User Equipment (UE), context information for one or more connected UE, Source IAB-Donor configurations related to the IAB-Node and the User Equipment connected to the IAB-Node (e.g., current radio resource control, other Layer 2 configurations), the source radio resource configuration of the IAB-Donor and the IAB-Node, or the source radio resource configuration of one or more connected UE. In aspects, the configuration information in the Handover Request message 1004 includes measurement result information (e.g., in a Measurement Result message).

Target Central Unit Acceptance of Handover

Responsive to receiving the Handover Request message 1004, the Target IAB-Donor 125 may perform an Admission Control procedure 1040 to decide whether to accept handover of the IAB-Node 830 (e.g., to validate that sufficient resources are available to receive the IAB-Node 830 and any connected UE 110).

If the Target IAB-Donor 125 accepts the handover, the Target IAB-Donor 125 generates and sends a Handover Request Acknowledgment message 1006 to the Source IAB-Donor 123. Utilizing the configuration information received in a handover request message 1004, the Target IAB-Donor 125 (e.g., Target CU 860) may determine a configuration type and decide whether to perform delta configuration based on the current configuration from the source node or whether to perform full configuration. Where the determined configuration type is a delta configuration, the Target IAB-Donor 125 performs a delta configuration change based on the current configuration received from the Source IAB-Donor 123, generates the Handover Request Acknowledgement message 1006 that includes the current configuration from the configuration information, and sends the Handover Request Acknowledgement message 1006 to the Source IAB-Donor 123. Where the determined configuration type is a full configuration, the Target IAB-Donor 125 performs a full configuration, generates a Handover Request Acknowledgement message 1006 that does not include the current configuration from the configuration information, and sends the Handover Request Acknowledgement message 1006 to the Source IAB-Donor 123.

The Handover Request Acknowledgement message 1006 informs the Source IAB-Donor 123 about the prepared resources at the Target IAB-Donor 125. If handover to the Target IAB-Donor 125 fails, the Target IAB-Donor 125 may communicate the failure to the Source IAB-Donor 123 in a message that includes a cause value to enable the Source IAB-Donor 123 to determine the reason for the failure to handover.

Handover Request Acknowledgment

In aspects, the Handover Request Acknowledgment message 1006 may carry one or more radio resource control (RRC) messages (e.g., a Handover Command message, an RRC Configuration message). In aspects, the Handover Request Acknowledgment message 1006 carries one or more RRC Reconfiguration messages for informing at least one of the Source IAB-Donor 123, the IAB-Node 830, or connected UE 110 about the prepared resources at the Target IAB-Donor 125. The RRC Reconfiguration messages may be based on the configuration type determined.

In aspects, the Handover Request Acknowledgement message 1006 carries a Node RRC Configuration message for the IAB-Node 830. In aspects, the Node RRC Configuration message includes the RRC configuration of the IAB-Node 830.

In aspects, the Handover Request Acknowledgement message 1006 carries a UE RRC Reconfiguration message for the connected UE 110. In aspects, the UE RRC Reconfiguration message provides the radio resource control configuration of UE 110 connected to the IAB-Node 830, since the related UE configurations will be handled by the CU-CP residing in the Target IAB-Donor 125 after the handover as well.

In aspects, the Handover Request Acknowledgement message 1006 carries an RRC Reconfiguration message for any subtending IAB-Nodes to handover to the Target IAB-Donor 125. In aspects, the RRC Reconfiguration message for subtending IAB-Nodes may carry the RRC configuration of the subtending IAB-Nodes. In aspects, a second RRC Reconfiguration message directs subtending IAB-Nodes held by the IAB-Node 832 to handover to the Target IAB-Donor 125 and the second RRC Reconfiguration message includes the RRC configuration of the subtending IAB-Nodes.

Responsive to receiving the Handover Request Acknowledgement message 1006 from the Target IAB-Donor 125, the Source IAB-Donor 123 forwards the Node RRC Reconfiguration message to the IAB-Node 830 and the UE RRC Reconfiguration messages to the connected UE 110.

In aspects, the UE RRC Reconfiguration messages may be encapsulated in an RRC Reconfiguration message 1008 sent by the Source IAB-Donor 123 to the IAB-Node 830. In aspects, the UE RRC Reconfiguration messages to the connected UE 110 and the Node RRC Reconfiguration message to the IAB-Node 830 may be sent separately, as the RRC connections can be configured in parallel. In aspects, the RRC messages sent to and from connected UE 110 are over the data radio bearer (DRB) of the IAB-Node 830, since they have been protected by the PDCP layer of the connected UE 110 and the Source IAB-Donor 123.

Node RRC Reconfiguration

The RRC Reconfiguration message 1008 carries configuration information and includes the RRC configuration of the IAB-Node 830. In aspects, a Node RRC Reconfiguration message contains the configuration required by the Mobile-Termination function of the IAB-Node 830 to communicate with the next hop IAB-Node (e.g., IAB-Node 832) towards the Target IAB-Donor 125 or directly with the Target IAB-Donor 125. After an IAB-Node 830 receives a Node RRC Reconfiguration message, there may be random access procedure for the IAB-Node 830 to connect to the Target IAB-Donor 125 or the next hop IAB-Node in the case of a subtending node. Responsive to receiving the Node RRC Configuration in the RRC Reconfiguration message 1008, the IAB-Node 830 performs the required RRC reconfiguration.

UE RRC Reconfiguration

The RRC Reconfiguration messages to the UEs connected to the IAB-node contains the configuration required by the UE to communicate with the IAB-node towards the target IAB-donor.

Responsive to receiving the RRC Configuration (UE RRC Reconfiguration) of UE 110 connected to the IAB-Node 830 (e.g., in an RRC Reconfiguration message carried in a Handover Request Acknowledgement message 1006), the Source IAB-Donor 123 may forward the UE RRC Configuration to the IAB-Node 830. In aspects, the UE RRC Configuration may be encapsulated in an RRC Reconfiguration message 1008 sent to the IAB-Node 830 by the Source IAB-Donor 123. In aspects, the UE RRC Configuration may be sent by the Source IAB-Donor 123 separate from an RRC Reconfiguration message 1008, as the RRC connections can be configured in parallel. In aspects, radio resource control messages to and from UE may be carried over the data radio bearers (DRB) of the IAB-Node 830 since the DRB have been protected by the PDCP layer of the UE 110 and the Source IAB-Donor 123.

In aspects, the RRC Reconfiguration message 1008 carries a Handover Command message for the UE 110 to perform handover to the Target IAB-Donor 125. In aspects, an RRC Reconfiguration message 1008 to the UE 110 connected to the IAB-Node 830 includes the configuration utilized by the UE to communicate with the IAB-Node 830 towards the Target IAB-Donor 125.

In aspects, responsive to receiving the RRC configuration of connected UE in one or more such RRC Reconfiguration messages 1008, the IAB-Node 830 generates and sends an RRC Reconfiguration message 1010 to the UE 110 to perform handover to the Target IAB-Donor 125. In aspects, the RRC Reconfiguration message 1010 may carry one or more of the RRC Reconfiguration messages 1008 (e.g., UE RRC Reconfiguration message) generated by the Target IAB-Donor 125 to the UE 110. As for the UE 110, since the UE 110 may still connect to the same IAB-Node (e.g., IAB-Node 830, IAB-Node 832, IAB-Node 842) as before the procedure 1000, a random access procedure for the UE 110 to connect to the Target IAB-Donor 125 may not be necessary.

Responsive to receiving the one or more RRC Reconfiguration messages 1010, the UE 110 perform the required RRC Reconfiguration. Upon performing RRC Reconfiguration, the UE 110 may generate and send an RRC Reconfiguration Complete message 1012 to the IAB-Node 830 as confirmation of RRC Reconfiguration.

UE Context Release Request

Responsive to receiving an RRC Reconfiguration Complete message 1012 from a connected UE 110, the IAB-Node 830 forwards the RRC Reconfiguration Complete message 1012 to the Target IAB-Donor 125 via one or more UE RRC Reconfiguration Complete messages 1014 indicating the completion of RRC Reconfiguration of the connected UE 110

Responsive to determining that the IAB-Node 830 has received an RRC Reconfiguration Complete message from all UE 110 connected to the IAB-Node 830 and that the IAB-Node 830 has successfully handover to the Target IAB-Donor 125, the IAB-Node 830 can regard itself (and all UE 110 connected to it) as successfully handover to the Target IAB-Donor 125. Responsive to the completion of handover, the IAB-Node 830 can release the related connection and interface with the Source IAB-Donor 823. Responsive to completion of handover of the IAB-Node 830, the IAB-Node 830 generates and sends an IAB-Node RRC Reconfiguration Complete message 1016 to the Target IAB-Donor 125 indicating the completion of handover of the IAB-Node 830 and connected UE 110 to the Target IAB-Donor 125. The transmission order of the UE RRC Reconfiguration Complete message 1014 from User Equipment and the IAB-Node RRC Reconfiguration Complete message 1016 from the IAB-Node 830, may not be the same as illustrated in FIG. 10.

In aspects, the IAB-Node RRC Reconfiguration Complete message 1016 from the IAB-Node 830 to the Target IAB-Donor 125 may encapsulate the RRC Reconfiguration Complete messages 1012 from the UE 110 connected to the IAB-Node 830. In aspects, the RRC Reconfiguration Complete messages 1012 from the UE 110 (encapsulated in the UE RRC Reconfiguration Complete message 1014) and IAB-Node RRC Reconfiguration Complete messages 1016 from the IAB-Node 830 may be sent to the Target IAB-Donor 125 separate from one another, as the radio resource control connections can be configured in parallel. In aspects, radio resource control messages to and from UE 110 may be carried over the data radio bearers (DRB) of the IAB-Node 830 since the DRB have been protected by the PDCP layer of the UE 110 and Target IAB-Donor 125.

RRC Connection Reconfiguration Complete

The handover process from Source IAB-Donor 123 to the Target IAB-Donor 125 can be regarded as completed when the IAB-Node 830 and all the connected UE 110 have sent back an RRC Reconfiguration Complete message (e.g., an UE RRC Reconfiguration Complete message 1014, an IAB-Node RRC Reconfiguration Complete message 1016) to the Target IAB-Donor 125 successfully.

Example Methods

Example methods 1100 and 1200 are described with reference to FIGS. 13 and 14 in accordance with one or more aspects of maintaining communication and signaling interfaces through a network role transition (e.g., through integrated access and backhaul node (IAB-Node) handover between integrated access and backhaul donors (IAB-Donors)). Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-Chip systems (SoCs), Complex Programmable Logic Devices (CPLDs), and the like. The order in which the method blocks are described in these Figures is not intended to be construed as a limitation, and any number of the described method blocks can be combined in any order to implement a method, or an alternate method.

Figure 11:
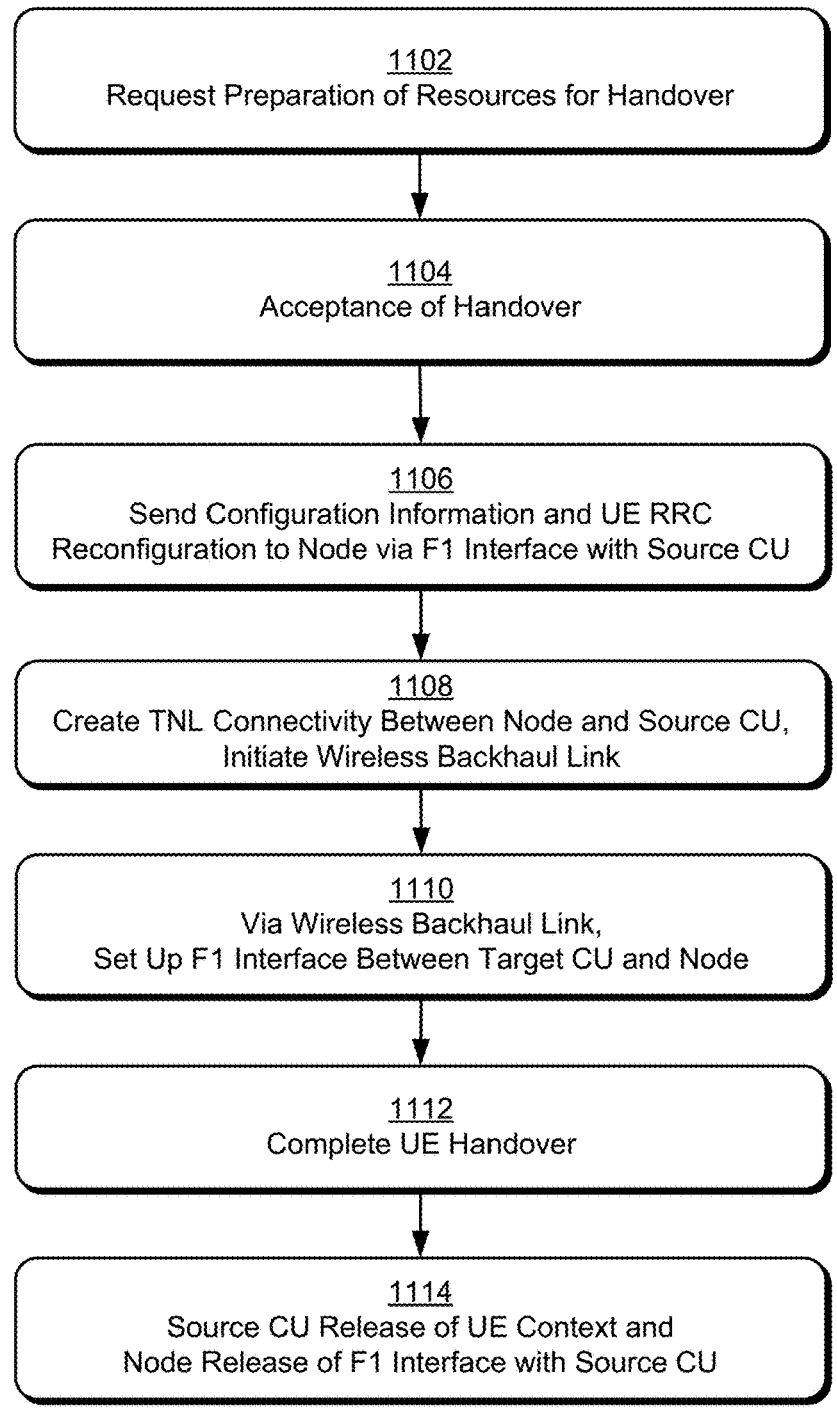
FIG. 11 illustrates an example method for handover of a node base station from a source donor base station to a target donor base station in accordance with one or more aspects of maintaining communication and signaling interfaces through a network role transition.

FIG. 11 illustrates example method(s) 1100 for maintaining communication interfaces in a wireless network through a network role transition. For example, a method for handover of a node base station (e.g., IAB-Node) from a source donor base station (e.g., source IAB-Donor base station) to a target donor base station (e.g., target IAB-Donor base station). In aspects, the node base station is engaged with the source donor base station via a first F1 interface. In aspects, the Distributed Unit (DU) of the node base station is engaged with a Central Unit (Source CU) of the source base station and the DU is connected to the Source CU via a first F1 interface.

At block 1102, the node base station requests preparation of resources for handover of the node base station from the source base station to the target base station. In aspects, measured parameters related to the node base station (measurement result information) are sent by the node base station to the Source CU to trigger the handover of the node base station from the source base station to the target base station. Responsive to receiving the request for handover (e.g., a measurement report message), the source base station determines whether to initiate handover of the node base station (and connected UE) to the target base station.

At block 1104, the source base station and the target base station decide to accept handover. In aspects, responsive to the source base station determining to initiate handover, the source base station generates and sends a Handover Request message to the target base station requesting preparation of resources for handover of the node base station and connected User Equipment (UE) to the target base station, including configuration information. In aspects, responsive to the target base station determining to accept handover of the node base station and connected UE, the target base station generates and sends a Handover Request Acknowledgement message to the source base station regarding the prepared resources at the target base station, including configuration information relating to the target base station. In aspects, the Handover Request Acknowledgement message includes Handover Command messages for at least one of the node base station, any subtending node base stations, and any connected UE. In aspects, the Handover Request Acknowledgement message may include the RRC configuration of UE connected to the node base station.

At block 1106, the source base station receives the Handover Request Acknowledgement message and sends a first interface message to the node base station via the first F1 interface, notifying the DU about the handover decision. The first interface message including the configuration information. The first interface message including the Handover Command message(s) (e.g., UE RRC Reconfiguration).

At block 1108, based on the received configuration information, the DU creates Transport Network Layer (TNL) connectivity towards the Target CU and the DU implements a wireless backhaul link with the Target CU utilizing the TNL connectivity.

At block 1110, the DU exchanges application layer configuration data with the Target CU via the wireless backhaul link implemented utilizing the TNL connectivity and sets up a second F1 interface with the Target CU utilizing the application layer configuration data.

At block 1112, the DU completes UE handover by generating an RRC Handover Command message to the connected UE to handover to the target donor base station, sending the RRC Handover Command message to the connected UE, and confirming handover of the connected UE to the Target CU. In aspects, the DU further generates a UE Context Release Message requesting release of UE context stored at the Source CU and sends the UE Context Release Message to the Source CU via the first F1 interface.

At block 1114, the DU releases the first F1 interface with the Source CU.

Figure 12:
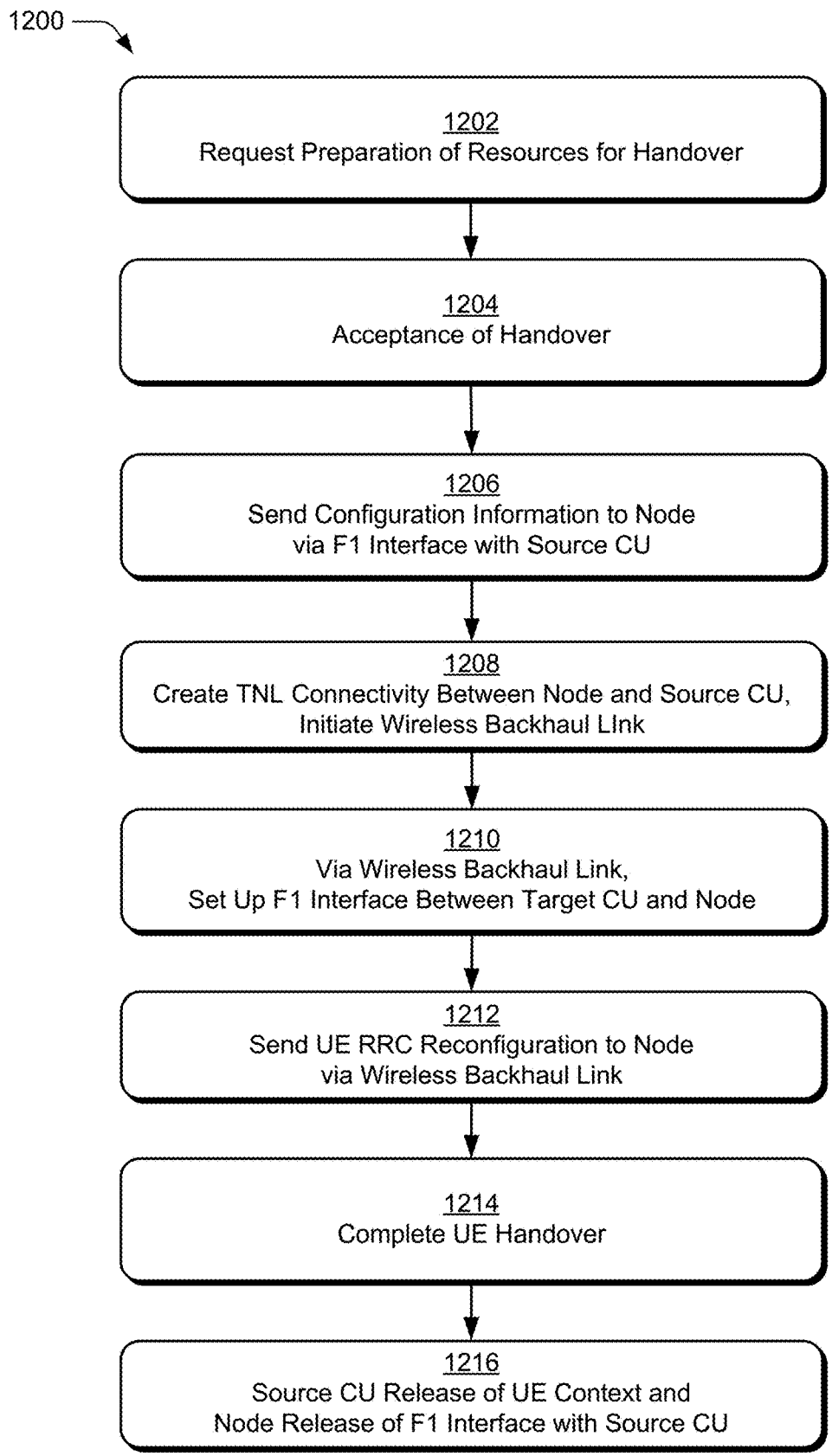
FIG. 12 illustrates an example method for handover of a node base station from a source donor base station to a target donor base station in accordance with one or more aspects of maintaining communication and signaling interfaces through a network role transition.

FIG. 12 illustrates example method(s) 1200 for maintaining communications interfaces in a wireless network through a network role transition. For example, a method for handover of a node base station (e.g., IAB-Node) from a source donor base station (e.g., source IAB-Donor base station) to a target donor base station (e.g., target IAB-Donor base station). In aspects, the node base station is engaged with the source donor base station via a first F1 interface. In aspects, the Distributed Unit (DU) of the node base station is engaged with a Central Unit (Source CU) of the source base station and the DU is connected to the Source CU via a first F1 interface.

At block 1202, the node base station requests handover of the node base station from the source base station to the target base station. In aspects, measured parameters related to the node base station (measurement result information) are sent by the node base station to the Source CU to trigger the handover of the node base station from the source base station to the target base station. Responsive to receiving the request for handover (e.g., a measurement report message), the source base station determines whether to initiate handover of the node base station (and connected UE) to the target base station.

At block 1204, the source base station and the target base station decide to accept handover. In aspects, responsive to the source base station determining to initiate handover, the source base station generates and sends a Handover Request message to the target base station requesting preparation of resources for handover of the node base station and connected User Equipment to the target base station, including configuration information. In aspects, responsive to the target base station determining to accept handover of the node base station and connected UE, the target base station generates and sends a Handover Request Acknowledgement message to the source base station regarding the prepared resources at the target base station, including configuration information relating to the target base station.

At block 1206, the source base station receives the Handover Request Acknowledgement message and sends a first interface message to the node base station via the first F1 interface, notifying the DU about the handover decision. The first interface message includes the configuration information.

At block 1208, based on the received configuration information, the DU creates Transport Network Layer (TNL) connectivity towards the Target CU and the DU implements a wireless backhaul link with the Target CU utilizing the TNL connectivity.

At block 1210, the DU exchanges application layer configuration data with the Target CU via the wireless backhaul link implemented utilizing the TNL connectivity and sets up a second F1 interface with the Target CU utilizing the application layer configuration data.

At block 1212, the Target CU sends a second interface message to the DU. The second interface message includes at least one Handover Command message for at least one of the node base station, any subtending node base stations, and any connected UE. The Handover Command message may include the RRC configuration of UE connected to the node base station.

At block 1214, the DU completes UE handover by generating an RRC Handover Command message to the connected UE to handover to the target donor base station, sending the RRC Handover Command message to the connected UE, and confirming handover of the connected UE to the Target CU. In aspects, the DU further generates a UE Context Release Message requesting release of UE context stored at the Source CU and sends the UE Context Release Message to the Source CU via the first F1 interface.

At block 1216, the DU releases the first F1 interface with the Source CU.

Figure 13:
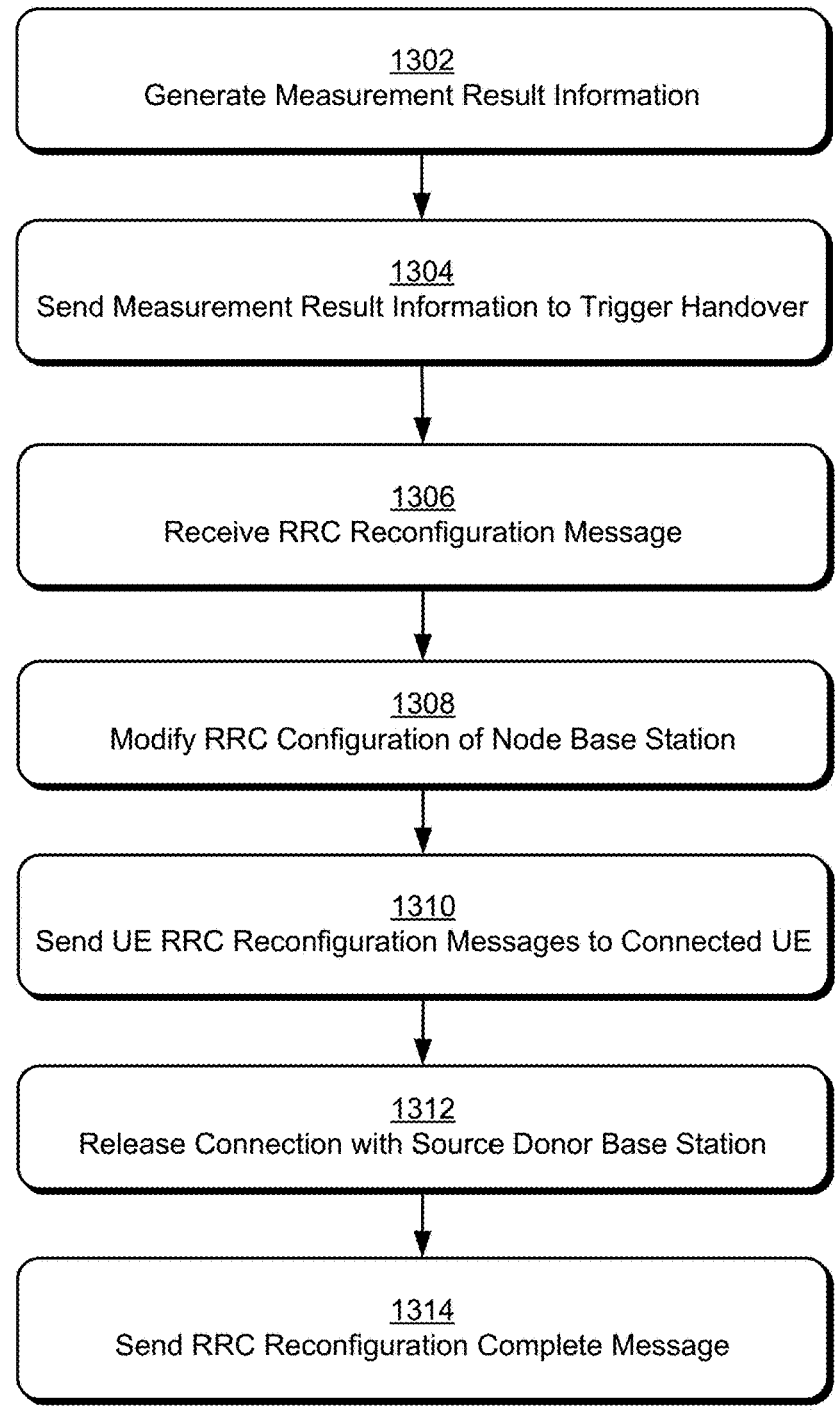
FIG. 13 illustrates an example method for maintaining radio resource control (RRC) signaling interfaces through handover in accordance with one or more aspects of maintaining communication and signaling interfaces through a network role transition.

FIG. 13 illustrates example method(s) 1300 for maintaining radio resource control (RRC) signaling interfaces through handover. For example, a method of maintaining RRC signaling interfaces through handover, from a source donor base station to a target donor base station, of a node base station and user equipment (UE) connected to the node base station.

At block 1302, the node base station generates measurement result information including one or more measured parameters related to the node base station. At block 1304, the node base station sends the measurement result information to the source donor base station for triggering handover of the node base station and connected UE from the source donor base station to the target donor base station. At block 1306, the node base station receives a Radio Resource Control (RRC) Reconfiguration message from the source donor base station, the RRC Reconfiguration message directing modification of the RRC configuration of the node base station and including at least one UE RRC Reconfiguration message for the connected UE. At block 1308, responsive to receiving the RRC Connection Reconfiguration message, the node base station modifies the RRC configuration of the node base station. At block 1310, responsive to receiving the RRC Connection Reconfiguration message, the node base station sends the UE RRC Reconfiguration messages to the connected UE. At block 1312, the node base station releases the connection with the source donor base station. At block 1314, the node base station sends an RRC Reconfiguration Complete message to the target donor base station confirming handover of the node base station.

Although aspects of maintaining communication and signaling interfaces in a wireless network through a network role transition have been described in language specific to features and/or methods, the subject of the appended claims is not necessarily limited to the specific features or methods described. Rather, the specific features and methods are disclosed as example implementations of central unit-distributed unit architecture, and other equivalent features and methods are intended to be within the scope of the appended claims. Further, various different aspects are described, and it is to be appreciated that each described aspect can be implemented independently or in connection with one or more other described aspects.

As used herein, a phrase referring to "at least one of" a list of items refers to any combination of those items, including single members. As an example, "at least one of: a, b, or c"

is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, c-c-c or any other ordering of a, b, and c).

In the following, some examples are described:

Example 1: A system for handover in a wireless network, the system comprising: a source base station, the source base station comprising: a source central unit; one or more distributed units, the one or more distributed units being connected to the source central unit via a F1 interface; a target base station, the target base station comprising: a target central unit; the source base station configured to: send a handover request message requesting the preparation of resources for a handover of one or more of the distributed units to the target central unit of the target base station; and the target base station configured to: receive the handover request message requesting the preparation of resources for a handover of one or more of the distributed units.

Example 2: The system of example 1, wherein the target central unit performs admission control to decide whether to accept the handover.

Example 3: The system of at least one of the preceding examples, wherein the handover request message comprises configuration information.

Example 4: The system of example 3, wherein the configuration information comprises at least one: integrated access and backhaul node (IAB-Node) capability, IAB-Node Radio Access Network context information, or source radio resource configuration of the target central unit and the one or more distributed units.

Example 5: The system of at least one of example 3 or example 4, wherein based on the configuration information, the target central unit determines whether to apply a delta configuration to the current configuration or perform a full configuration.

Example 6: The system of at least one of the preceding examples, further comprising at least one User Equipment connected to a distributed unit, wherein the handover request message comprises configuration information, the system, and wherein the configuration information comprises at least one: integrated access and backhaul node (IAB-Node) capability, IAB-Node Radio Access Network context information, connected User Equipment capability information, connected User Equipment context information, source radio resource configuration of the target central unit and the distributed unit, or source radio resource configuration of the User Equipment.

Example 7: The system of at least one of the preceding examples, wherein based on the received handover request message the target base station is configured to: prepare resources for a handover of one or more of the distributed units; and send a response message about the prepared resources at the target base station to the source base station.

Example 8: The system of example 7, wherein the target base station provides radio resource control reconfiguration information for one or more of the distributed units as part of the response message to the source base station.

Example 9: The system of example 8, wherein radio resource control reconfiguration information further comprises radio resource control configuration of at least one user equipment connected to one or more of the distributed units.

Example 10: The system of at least one of the preceding examples, wherein the source central unit of the source base station is configured to receive the response message, and wherein based on receipt of the response message, the source central unit is configured to send a User Equipment Context Modification Request message from the source central unit to the one or more of the distributed units, via the F1 interface.

Example 11: The system of example 10, wherein the User Equipment Context Modification Request message comprises radio resource control reconfiguration information provided by the target base station for the user equipment to perform handover of an existing F1 interface between source central unit and the one or more distributed units.

Example 12: The system of example 11, wherein radio resource control reconfiguration information comprises a radio resource control configuration of at least one user equipment connected to one or more of the distributed units.

Example 13: The system of example 10, wherein the User Equipment Context Modification Request message comprises a modification request from the target central unit for future F1 interface between target central unit and one or more distributed units, even if the F1 interface has not been setup between them.

Example 14: The system of example 10, wherein the User Equipment Context Modification Request message sent to the one or more distributed units via, the F1 interface, comprises at least one of radio bearers to be setup, radio bearers to be modified, or radio bearers to be released.

Example 15: The system of example 10, wherein a User Equipment Context Modification Response message may be sent from at least one of the distributed units to the source central unit, via the F1 interface, as a confirmation of receipt of the User Equipment Context Modification Request message.

Example 16: The system of example 15, wherein the User Equipment Context Modification Response message is forwarded by the source central unit in another message to the target central unit if the User Equipment Context Modification message was sent by the source central unit, but on behalf of target central unit.

Example 17: The system of example 15, wherein the User Equipment Context Modification Request message contains information about the target central unit.

Example 18: The system of example 17, wherein based on the information about the target central unit, at least one of the distributed units creates Transport Network Layer connectivity toward the target central unit.

Example 19: The system of example 18, wherein after creating Transport Network Layer connectivity toward the target central unit, the at least one of the distributed units sends a F1 Setup Request message to the target central unit.

Example 20: The system of example 19, wherein the target central unit replies to the F1 Setup Request message with a F1 Setup Response message providing application level data for the at least one of the distributed units and the target central unit to correctly interoperate on the F1 interface.

Example 21: The system of example 20, wherein the at least one of the distributed units and the target central unit communicate via a wireless backhaul link.

Example 22: The system of example 20, wherein the target central unit sends a UEContextModificationRequest to at least one of the distributed units after the F1 interface has been setup.

Example 23: The system of example 22, wherein the at least one of the distributed units sends a User Equipment Context Release Request to the source central unit to release User Equipment context stored at the source central unit after the at least one of the distributed units receives a corresponding User Equipment Radio Resource Control Reconfiguration Complete message from the User Equipment.

Example 24: The system of example 23, where the at least one of the distributed units forwards the User Equipment Radio Resource Control Reconfiguration Complete message to the target central unit to finish the handover procedure for one or more User Equipment connected to the at least one of the distributed units.

Example 25: The system of example 24, wherein after all connected User Equipment have successfully performed handover to the target central unit, the at least one of the distributed units can regard itself as successfully handover to the target base station and can release the related connection and F1 interface with the source base station.

Example 26: A method performed by a wireless network in an integrated access and backhaul architecture, the method comprising: measuring parameters related to at least one of reference signal measuring, geolocation data, moving speed, and moving direction; analyzing the measured parameters to determine a need to handover at least one IAB-node distributed unit connected to a first IAB-donor central unit via a F1 interface between the first IAB-donor central unit and a second IAB-donor central unit, at least one User Equipment is attached to the at least one IAB-node distributed unit; sending, by the first IAB-donor central unit, a handover request message to the second IAB-donor central unit requesting the preparation of resources for a handover of the at least one IAB-node distributed unit and the connected user equipment to the second IAB-donor central unit; receiving, by the second IAB-donor central unit, the handover request message containing a handover request requesting the preparation of resources for a handover of the at least one IAB-node distributed unit and the connected user equipment; determining, by the second IAB-donor central unit, whether to accept handover of the at least one IAB-node distributed unit and its connected user equipment; and sending, by the second IAB-donor upon determining to accept handover, a handover request acknowledgement to the first IAB-donor.

Example 27: The method of example 26, further comprising: performing, by the second IAB-donor central unit, admission control to decide whether to accept the handover request; preparing resources for a handover of the at least one IAB-node distributed unit; sending, by the second IAB-donor central unit, a response message to the first IAB-donor central unit about the prepared resources at the second IAB-donor central unit, including radio resource control reconfiguration information for the at least one IAB-node distributed unit; receiving, by the first IAB-donor central unit, the response message; and sending, from the first IAB-donor central unit to the at least one IAB-node distributed unit, via the F1 interface, a User Equipment Context Modification Request message comprising the radio resource control reconfiguration information provided by the second IAB-donor central unit, the User Equipment Context Modification Request message requesting the IAB-node distributed units to perform handover of an existing F1 interface between first IAB-donor central unit and the at least one IAB-node distributed unit.

Example 28: The method of example 27, wherein the User Equipment Context Modification Request message comprises a modification request from the second IAB-donor central unit for future F1 interface between second IAB-donor central unit and the at least one IAB-node distributed unit, even if the F1 interface has not been setup between them; and wherein the User Equipment Context Modification Request message comprises at least one radio bearer to be setup, modified, or released.

Example 29: The method of example 28, further comprising: notifying the at least one IAB-node distributed unit, by the first IAB-donor central unit, of the handover decision; providing, via the User Equipment Context Modification Request message, information about the second IAB-donor central unit; creating, by the at least one IAB-node distributed unit, Transport Network Layer connectivity toward the second IAB-donor central unit; sending via a wireless backhaul link, by the at least one IAB-node distributed unit to the second IAB-donor central unit, a F1 Setup Request message; and replying via a wireless backhaul link, by the second IAB-donor central unit to the at least one IAB-node distributed unit, with a F1 Setup Response and exchanging application level data for the at least one distributed unit and the second IAB-donor central unit to correctly interoperate on the F1 interface.

Example 30: The method of example 29, further comprising: receiving, by the at least one IAB-node distributed unit, a User Equipment Radio Resource Control Reconfiguration Complete message from the User Equipment; sending, by the at least one IAB-node distributed unit to the first IAB-donor central unit, a User Equipment Context Release Request message requesting release of User Equipment context stored at the first IAB-donor central unit; forwarding, by the at least one IAB-node distributed unit to the second IAB-donor central unit, the User Equipment Radio Resource Control Reconfiguration Complete message; confirming that all User Equipment connected to the at least one IAB-node distributed unit have successfully performed handover to the second IAB-donor central unit; and releasing, by the at least one IAB-node distributed unit, the related connection and F1 interface with the first IAB-donor central unit.

Example 31: The method of example 29 wherein the handover request message sent by the first IAB-donor central unit further requests the preparation of resources for a handover, to the second IAB-donor central unit, of user equipment connected to the at least one IAB-node distributed unit.

Example 32: The method of example 27 wherein the handover request message received by the second IAB-donor central unit further contains a request for the preparation of resources for a handover, to the second IAB-donor central unit, of user equipment connected to the at least one IAB-node distributed unit.

Example 33: A method for maintaining communication interfaces through handover of a node base station from a source donor base station to a target donor base station, the node base station engaged with the source donor base station via a first F1 interface, the method comprising: sending, by the node base station, measurement result information to a Source Central Unit of the source donor base station; receiving, by a Distributed Unit of the node base station, a first interface message from the Source Central Unit, the first interface message notifying the Distributed Unit of a handover decision based on the measurement result information, the first interface message comprising configuration information; creating, by the Distributed Unit, Transport Network Layer connectivity towards a Target Central Unit of the target donor base station based on the received configuration information; implementing, by the Distributed Unit, a wireless backhaul link with the Target Central Unit utilizing the Transport Network Layer connectivity; exchanging, by the Distributed Unit, application layer configuration data with the Target Central Unit via the wireless backhaul link; setting up, by the Distributed Unit, a second F1 interface with the Target Central Unit utilizing the application layer configuration data; and releasing, by the Distributed Unit, the first F1 interface with the Source Central Unit.

Example 34: The method of example 33, wherein at least one User Equipment is connected to the node base station, the method further comprising: directing, by the Distributed Unit, the connected User Equipment to handover to the target donor base station; confirming, by the Distributed Unit, handover of the connected User Equipment to the target donor base station; and requesting, by the Distributed Unit, release of User Equipment context stored at the Source Central Unit.

Example 35: The method of example 34, wherein directing connected User Equipment to handover to the target donor base station comprises: receiving, by the Distributed Unit, a Handover Command message from at least one of the Source Central Unit or the Target Central Unit; generating, by the Distributed Unit, an RRC Handover Command message directing the connected User Equipment to perform a handover procedure and handover to the Target Central Unit; and sending, by the Distributed Unit, the RRC Handover Command message to the connected User Equipment.

Example 36: The method of example 34, wherein requesting release of User Equipment context stored at the Source Central Unit comprises: responsive to confirming handover of the connected User Equipment, generating, by the Distributed Unit, a User Equipment Context Release Request message requesting the release of User Equipment context stored at the Source Central Unit; and sending, by the Distributed Unit, the User Equipment Context Release Request message to the Source Central Unit via the first F1 interface.

Example 37: The method of example 34, wherein confirming handover of the connected User Equipment to the Target Central Unit comprises: receiving, by the Distributed Unit, a User Equipment RRC Reconfiguration Complete message from the connected User Equipment confirming handover to the Target Central Unit.

Example 38: The method of example 37, further comprising: responsive to receiving the User Equipment RRC Reconfiguration Complete message from the connected User Equipment confirming handover to the Target Central Unit, generating, by the Distributed Unit, at least one Uplink RRC Transfer message to the Target Central Unit for finishing handover of the connected User Equipment; and sending, by the Distributed Unit via the second F1 interface, the at least one Uplink RRC Transfer message to the Target Central Unit.

Example 39: The method of example 38, wherein the Uplink RRC Transfer message carries one or more User Equipment RRC Reconfiguration Complete messages received by the Distributed Unit from the connected User Equipment.

Example 40: The method of at least one of the examples 33 to 39, further comprising: receiving, by the Distributed Unit, a Handover Command message from the Source Central Unit, wherein the Handover Command message is carried by the first interface message received over the first F1 interface from the Source Central Unit; and the Handover Command message directs at least one of: handover of connected User Equipment to the target donor base station; handover of User Equipment connected to a subtending node base station to the target donor base station; or handover of the node base station to the target donor base station.

Example 41: The method of at least one of the examples 33 to 40, further comprising: receiving, by the Distributed Unit via the first F1 interface, the first interface message from the Source Central Unit, wherein the first interface message carries a User Equipment Context Modification Request message directing modification of User Equipment context; performing, by the Distributed Unit, User Equipment context modification; and sending, by the Distributed Unit via the first F1 interface, a User Equipment Context Modification Response message to the Source Central Unit as a confirmation of the User Equipment context modification.

Example 42: The method of at least one of the examples 33 to 41, further comprising: receiving, by the Distributed Unit via the second F1 interface, a second interface message from the Target Central Unit, the second interface message comprising a User Equipment Context Modification Request message directing modification of User Equipment context; performing, by the Distributed Unit, User Equipment context modification; and sending, by the Distributed Unit via the second F1 interface, a User Equipment Context Modification Response message to the Target Central Unit as a confirmation of the User Equipment context modification.

Example 43: The method of at least one of the examples 33 to 42, wherein: receiving, by the Distributed Unit, a Handover Command message from the Target Central Unit, the Handover Command message carried by a second interface message received over the second F1 interface from the Target Central Unit; and the Handover Command message directs at least one of: handover of connected User Equipment to the target donor base station; handover of User Equipment connected to a subtending node base station to the target donor base station; or handover of the node base station to the target donor base station.

Example 44: The method of at least one of the examples 33 to 43, wherein setting up the second F1 interface with the Target Central Unit comprises: generating, by the Distributed Unit, a F1 Setup Request message requesting setup of the second F1 interface between the Distributed Unit and the Target Central Unit; and sending, by the Distributed Unit via the wireless backhaul link implemented utilizing the Transport Network Layer connectivity, a F1 Setup Request message to the Target Central Unit.

Example 45: The method of at least one of the examples 33 to 44, wherein the configuration information comprises at least one of: configuration information relating to the target donor base station; or Operations, Administration, and Maintenance related information.

Example 46: The method of at least one of the examples 33 to 45, wherein the first interface message includes a modification request; and wherein the setting up, by the Distributed Unit, of the second F1 interface with the Target Central Unit is performed utilizing information provided in the modification request.

Example 47: The method of at least one of the examples 33 to 46, wherein the communication interfaces include RRC signaling interfaces.

Example 48: The method of at least one of the examples 33 to 47, wherein the first interface message further comprises an RRC Reconfiguration message.

Example 49: The method of at least one of the examples 33 to 48, wherein the second F1 interface is wireless.

Example 50: A base station comprising: a processor; one or more hardware-based transceivers; and a computer-readable storage medium having stored thereon instructions that, responsive to execution by the processor, cause the processor to execute the method of any of examples 33 to 49.

Example 51: A base station device comprising: a Distributed Unit held by a Source Central Unit of a source base station, the Distributed Unit engaged with the Source Central Unit via a first F1 interface; the base station device configured to: send measurement result information to the Source Central Unit; the Distributed Unit configured to: receive, a first interface message from the Source Central Unit, the first interface message notifying the Distributed Unit of a handover decision based on the measurement result information, the first interface message comprising configuration information; create Transport Network Layer connectivity toward a Target Central Unit of the target base station based on the received configuration information; implement a wireless backhaul link with the Target Central Unit utilizing the Transport Network Layer connectivity; exchange application layer configuration data with the Target Central Unit via the wireless backhaul link; set up a second F1 interface with the Target Central Unit utilizing the application layer configuration data; and release the first F1 interface with the Source Central Unit.

Example 52: The base station device of example 51, wherein at least one User Equipment is connected to the base station device; wherein the Distributed Unit is further configured to: direct connected User Equipment to handover to the target base station; confirm handover of the connected User Equipment to the Target Central Unit; and responsive to confirming handover of the connected User Equipment, request release of User Equipment context stored at the Source Central Unit.

Example 53: The base station device of example 52, wherein directing connected User Equipment to handover to the target base station comprises the Distributed Unit configured to: receive a Handover Command message from at least one of the Source Central Unit or the Target Central Unit; generate an RRC Handover Command message directing the connected User Equipment to perform a handover procedure and handover to the Target Central Unit; and send the RRC Handover Command message to the connected User Equipment.

Example 54: The base station device of example 52, wherein requesting release of User Equipment context stored at the Source Central Unit comprises the Distributed Unit configured to: generate a User Equipment Context Release Request message requesting the release of User Equipment context stored at the Source Central Unit responsive to confirming handover of the connected User Equipment; and send the User Equipment Context Release Request message to the Source Central Unit via the first F1 interface.

Example 55: The base station device of example 52, wherein to confirm handover of the connected User Equipment to the Target Central Unit, the Distributed Unit is further configured to: receive a User Equipment RRC Reconfiguration Complete message from the connected User Equipment confirming handover to the Target Central Unit.

Example 56: The base station device of example 55: wherein the Distributed Unit is configured to: generate at least one Uplink RRC Transfer message to the Target Central Unit for finishing the handover of the connected User Equipment responsive to receiving the User Equipment RRC Reconfiguration Complete message from the connected User Equipment confirming handover to the Target Central Unit; and send, via the second F1 interface, the at least one Uplink RRC Transfer message to the Target Central Unit.

Example 57: The base station device of example 56, wherein the Uplink RRC Transfer message carries one or more User Equipment RRC Reconfiguration Complete messages received by the Distributed Unit from the connected User Equipment.

Example 58: The base station device of at least one of the examples 51 to 57, wherein the Distributed Unit is further configured to: receive a Handover Command message from the Source Central Unit, wherein the first interface message received over the first F1 interface from the Source Central Unit carries the Handover Command message; and the Handover Command message directs at least one of: handover of connected User Equipment to the target base station; handover of User Equipment connected to a subtending node base station to the target base station; or handover of the node base station to the target base station.

Example 59: The base station device of at least one of the examples 51 to 58, further comprising: the Distributed Unit configured to: receive, via the first F1 interface, the first interface message from the Source Central Unit, wherein the first interface message carries a User Equipment Context Modification Request message directing modification of User Equipment context; perform User Equipment context modification; and send, via the first F1 interface, a User Equipment Context Modification Response message to the Source Central Unit as a confirmation of the User Equipment context modification.

Example 60: The base station device of at least one of the examples 51 to 59, further comprising: the Distributed Unit configured to: receive, via the second F1 interface, a second interface message from the Target Central Unit, the second interface message comprising a User Equipment Context Modification Request message directing modification of User Equipment context; perform User Equipment context modification; and send, via the second F1 interface, a User Equipment Context Modification Response message to the Target Central Unit as a confirmation of the User Equipment context modification.

Example 61: The base station device of at least one of the examples 51 to 60, wherein the Distributed Unit is further configured to: receive a Handover Command message from the Target Central Unit; wherein the Distributed Unit is configured to receive a second interface message over the second F1 interface from the Target Central Unit; wherein the second interface message carries the Handover Command message; and wherein the Handover Command message directs at least one of: handover of connected User Equipment to the target base station; handover of User Equipment connected to a subtending node base station to the target base station; or handover of the node base station to the target base station.

Example 62: The base station device of at least one of the examples 51 to 61, wherein setting up the second F1 interface with the Target Central Unit comprises the Distributed Unit configured to: generate a F1 Setup Request message requesting setup of the second F1 interface between the Distributed Unit and the Target Central Unit; and send, via the wireless backhaul link implemented utilizing the Transport Network Layer connectivity, a F1 Setup Request message to the Target Central Unit.

Example 63: The base station device of at least one of the examples 51 to 62, wherein the configuration information comprises at least one of: configuration information relating to the target donor base station; or Operations, Administration, and Maintenance related information.

Example 64: The base station device of at least one of the examples 51 to 63, wherein the first interface message includes a modification request; and wherein the Distributed Unit is configured to setting up the second F1 interface with the Target Central Unit utilizing information provided in the modification request.

Example 65: A method for maintaining radio resource control signaling interfaces through handover of a node base station and user equipment (UE) connected to the node base station from a source donor base station to a target donor base station, the method comprising: generating, by the node base station, measurement result information including one or more measured parameters related to the node base station; sending, by the node base station, the measurement result information to the source donor base station; receiving, by the node base station, a Radio Resource Control (RRC) Reconfiguration message from the source donor base station, the RRC Reconfiguration message directing modification of the RRC configuration of the node base station and including at least one UE RRC Reconfiguration message for the connected UE; responsive to receiving the RRC Connection Reconfiguration message, the node base station: modifying the RRC configuration of the node base station, and sending the UE RRC Reconfiguration messages to the connected UE; releasing, by the node base station, the connection with the source donor base station; and sending, by the node base station, an RRC Reconfiguration Complete message to the target donor base station confirming handover of the node base station.

Example 66: The method of example 65, further comprising: sending, by the node base station, a UE RRC Reconfiguration Complete message confirming handover of the connected UE.

Example 67: The method of example 66, wherein the node base station sends the UE RRC Reconfiguration Complete message to the target donor base station responsive to receiving RRC Reconfiguration Complete messages from all UE connected to the node base station.

Example 68: The method of at least one of examples 65 to 67, wherein the measurement result information is measured by at least one of the node base station or another device; and wherein the measurement result information comprises at least one of: a reference signal strength measurement; a current location of the node base station; a moving speed of the node base station; or a moving direction of the node base station.

Example 69: The method of at least one of examples 65 to 68, wherein an event triggers the node base station to send the measurement result information to the source donor base station; and wherein the event comprises at least one of: a proximity-based threshold; or a distance-based threshold.

Example 70: A base station comprising: a processor; one or more hardware-based transceivers; and a computer-readable storage medium having stored thereon instructions that, responsive to execution by the processor, cause the processor to execute the method of any of examples 65 to 69.

Example 71: A base station device comprising: a node base station held by a source donor base station, the node base station connected to a plurality of user equipment (UE); the base station device configured to: generate measurement result information including one or more measured parameters related to the node base station; send the measurement result information to the source donor base station; receive a Radio Resource Control (RRC) Reconfiguration message from the source donor base station, the RRC Reconfiguration message directing modification of an RRC configuration of the node base station and including at least one UE RRC Reconfiguration message for the connected UE; modify the RRC configuration of the node base station; send the UE RRC Reconfiguration messages to the connected UE; release the connection with the source donor base station; and send an RRC Reconfiguration Complete message to the target donor base confirming the handover of the node base station.

Example 72: The base station device of example 71, wherein the base station device is further configured to send a UE RRC Reconfiguration Complete message confirming handover of the connected UE.

Example 73: The base station device of at least one of examples 71 or 72, wherein the base station device is configured to send the UE RRC Reconfiguration Complete message to the target donor base station responsive to receiving RRC Reconfiguration Complete messages from all UE connected to the node base station.

Example 74: The base station device of at least one of examples 71 to 73, wherein the measurement result information is measured by at least one of the node base station or another device; and wherein the measurement result information comprises at least one of: a reference signal strength measurement; a current location of the node base station; a moving speed of the node base station; or a moving direction of the node base station.

Example 75: The base station device of at least one of examples 71 to 74, wherein an event triggers the base station device to send the measurement result information to the source donor base station; and wherein the event comprises at least one of: a proximity-based threshold; or a distance-based threshold.

What is claimed is:

1. A method for integrated access and backhaul (IAB) node migration comprising:
   connecting, by an IAB node base station, with a Source Central Unit of a source donor base station through a first F1 interface;
   sending, by the IAB node base station, a measurement report message to the Source Central Unit;
   receiving, by a Distributed Unit of the IAB node base station, a first interface message from the Source Central Unit over the first F1 interface, responsive to the measurement report message, the first interface message comprising configuration information;
   creating, by the Distributed Unit, Transport Network Layer connectivity towards a Target Central Unit of a target donor base station responsive to receiving the configuration information;
   setting up, by the Distributed Unit, a second F1 interface via a wireless backhaul link with the Target Central Unit utilizing the Transport Network Layer connectivity;
   exchanging, by the Distributed Unit, F1 application protocol (F1AP) configuration data with the Target Central Unit through the wireless backhaul link; and
   releasing, by the Distributed Unit, the first F1 interface with the Source Central Unit.

2. The method of claim 1, wherein at least one User Equipment is connected to the IAB node base station, the method further comprising:
   directing, by the Distributed Unit, the connected User Equipment to handover to the target donor base station;
   confirming, by the Distributed Unit, handover of the connected User Equipment to the target donor base station; and
   requesting, by the Distributed Unit, release of User Equipment context stored at the Source Central Unit.

3. The method of claim 2, wherein directing connected User Equipment to handover to the target donor base station comprises:
receiving, by the Distributed Unit, a Handover Command message from at least one of the Source Central Unit or the Target Central Unit;
generating, by the Distributed Unit, an RRC Handover Command message directing the connected User Equipment to perform a handover procedure and handover to the Target Central Unit; and
sending, by the Distributed Unit, the RRC Handover Command message to the connected User Equipment.

4. The method of claim 2, wherein requesting release of User Equipment context stored at the Source Central Unit comprises:
responsive to confirming handover of the connected User Equipment, generating, by the Distributed Unit, a User Equipment Context Release Request message requesting the release of User Equipment context stored at the Source Central Unit; and
sending, by the Distributed Unit, the User Equipment Context Release Request message to the Source Central Unit through the first F1 interface.

5. The method of claim 2, wherein confirming handover of the connected User Equipment to the target donor base station comprises:
receiving, by the Distributed Unit, a User Equipment RRC Reconfiguration Complete message from the connected User Equipment confirming handover to the Target Central Unit.

6. The method of claim 5, further comprising:
responsive to receiving the User Equipment RRC Reconfiguration Complete message from the connected User Equipment confirming handover to the Target Central Unit, generating, by the Distributed Unit, at least one Uplink RRC Transfer message to the Target Central Unit for finishing handover of the connected User Equipment; and
sending, by the Distributed Unit through the second F1 interface, the at least one Uplink RRC Transfer message to the Target Central Unit, wherein the Uplink RRC Transfer message carries one or more User Equipment RRC Reconfiguration Complete messages received by the Distributed Unit from the connected User Equipment.

7. The method of claim 1, further comprising:
receiving, by the Distributed Unit through the first F1 interface, the first interface message from the Source Central Unit, wherein the first interface message carries a User Equipment Context Modification Request message;
responsive to receiving the User Equipment Context Modification Request message, performing, by the Distributed Unit, User Equipment context modification; and
sending, by the Distributed Unit through the first F1 interface, a User Equipment Context Modification Response message to the Source Central Unit as a confirmation of the User Equipment context modification.

8. The method of claim 1, wherein:
receiving, by the Distributed Unit, a Handover Command message from the Target Central Unit, the Handover Command message carried by a second interface message received over the second F1 interface from the Target Central Unit; and
responsive to receiving the Handover Command message, performing at least one of:
handover of connected User Equipment to the target donor base station;
handover of User Equipment connected to a subtending IAB node base station to the target donor base station; or
handover of the IAB node base station to the target donor base station.

9. A base station device comprising:
a Distributed Unit connected to a Source Central Unit of a source base station, the Distributed Unit engaged with the Source Central Unit through a first F1 interface;
the base station device configured to:
send a measurement report message to the Source Central Unit;
the Distributed Unit configured to:
receive, a first interface message from the Source Central Unit over the first F1 interface, responsive to the measurement report message, the first interface message comprising configuration information;
create Transport Network Layer connectivity toward a Target Central Unit of a target base station responsive to receiving the configuration information;
set up a second F1 interface via a wireless backhaul link with the Target Central Unit utilizing the Transport Network Layer connectivity;
exchange F1 application protocol (F1AP) configuration data with the Target Central Unit through the wireless backhaul link;
and
release the first F1 interface with the Source Central Unit.

10. The base station device of claim 9,
wherein at least one User Equipment is connected to the base station device;
wherein the Distributed Unit is further configured to:
direct connected User Equipment to handover to the target base station;
confirm handover of the connected User Equipment to the Target Central Unit; and
responsive to confirming handover of the connected User Equipment, request release of User Equipment context stored at the Source Central Unit.

11. The base station device of claim 10, wherein directing connected User Equipment to handover to the target base station comprises the Distributed Unit configured to:
receive a Handover Command message from at least one of the Source Central Unit or the Target Central Unit;
generate an RRC Handover Command message directing the connected User Equipment to perform a handover procedure and handover to the Target Central Unit; and
send the RRC Handover Command message to the connected User Equipment.

12. The base station device of claim 10, wherein requesting release of User Equipment context stored at the Source Central Unit comprises the Distributed Unit configured to:
generate a User Equipment Context Release Request message requesting the release of User Equipment context stored at the Source Central Unit responsive to confirming handover of the connected User Equipment; and
send the User Equipment Context Release Request message to the Source Central Unit through the first F1 interface.

13. The base station device of claim 10, wherein to confirm handover of the connected User Equipment to the Target Central Unit, the Distributed Unit is further configured to:
receive a User Equipment RRC Reconfiguration Complete message from the connected User Equipment confirming handover to the Target Central Unit.

14. The base station device of claim 13, wherein the Distributed Unit is further configured to:
generate at least one Uplink RRC Transfer message to the Target Central Unit for finishing the handover of the connected User Equipment responsive to receiving the User Equipment RRC Reconfiguration Complete message from the connected User Equipment confirming handover to the Target Central Unit; and
send, through the second F1 interface, the at least one Uplink RRC Transfer message to the Target Central Unit, wherein the Uplink RRC Transfer message carries one or more User Equipment RRC Reconfiguration Complete messages received by the Distributed Unit from the connected User Equipment.

15. A method comprising:
generating, by an IAB node base station, a measurement report message including one or more measured parameters related to the IAB node base station;
sending, by the IAB node base station, the measurement report message to a source donor base station;
receiving, by the IAB node base station, a Radio Resource Control Reconfiguration message from the source donor base station, the Radio Resource Control Reconfiguration message directing modification of a Radio Resource Control configuration of the IAB node base station and including at least one user equipment Radio Resource Control Reconfiguration message for user equipment connected to the IAB node base station;
responsive to receiving the Radio Resource Control Connection Reconfiguration message, the IAB node base station:
modifying the Radio Resource Control configuration of the IAB node base station to handover the IAB node base station to a target donor base station, and
sending the user equipment Radio Resource Control Reconfiguration messages to the connected user equipment;
releasing, by the IAB node base station, the connection with the source donor base station; and
sending, by the IAB node base station, a Radio Resource Control Reconfiguration Complete message to the target donor base station confirming handover of the IAB node base station.

16. The method of claim 15, further comprising:
sending, by the IAB node base station to the target donor base station, a user equipment Radio Resource Control Reconfiguration Complete message confirming handover of the connected user equipment.

17. The method of claim 16, further comprising:
sending, by the IAB node base station, the user equipment Radio Resource Control Reconfiguration Complete message to the target donor base station responsive to receiving Radio Resource Control Reconfiguration Complete messages from all user equipment connected to the IAB node base station.

18. A base station device comprising:
an IAB node base station held by a source donor base station, the IAB node base station connected to a plurality of user equipment;
the base station device configured to:
generate a measurement report message including one or more measured parameters related to the IAB node base station;
send the measurement report message to the source donor base station;
receive a Radio Resource Control Reconfiguration message from the source donor base station, the Radio Resource Control Reconfiguration message directing modification of a Radio Resource Control configuration of the IAB node base station and including at least one user equipment Radio Resource Control Reconfiguration message for the connected user equipment;
modify the Radio Resource Control configuration of the IAB node base station to handover the IAB node base station to a target donor base station;
send the user equipment Radio Resource Control Reconfiguration messages to the connected user equipment;
release the connection with the source donor base station; and
send a Radio Resource Control Reconfiguration Complete message to the target donor base station confirming the handover of the IAB node base station.

19. The base station device of claim 18,
wherein the base station device is further configured to send a user equipment Radio Resource Control Reconfiguration Complete message to the target donor base station confirming handover of the connected user equipment.

20. The base station device of claim 19,
wherein the base station device is configured to send the user equipment Radio Resource Control Reconfiguration Complete message to the target donor base station responsive to receiving Radio Resource Control Reconfiguration Complete messages from all user equipment connected to the IAB node base station.

* * * * *